US005322477A

United States Patent [19]

Armington et al.

[11] Patent Number: 5,322,477

[45] Date of Patent: Jun. 21, 1994

[54] DOWNSIZED CUSHIONING DUNNAGE CONVERSION MACHINE AND PACKAGING SYSTEMS EMPLOYING THE SAME

[75] Inventors: Steven E. Armington, Kirtland; Richard O. Ratzel, Westlake; Walter J. Brugge, Highland Hts.; John E. Silvis, Fairport; William J. Dobson, Moreland Hills, all of Ohio

[73] Assignee: Ranpak Corp., Concord Township, Ohio

[21] Appl. No.: 592,572

[22] Filed: Oct. 5, 1990

[51] Int. Cl.[5] .......... B31F 5/02; B31F 1/00; B31D 5/02; B32B 7/02

[52] U.S. Cl. .......... 493/346; 493/349; 493/350; 493/352; 493/967

[58] Field of Search .......... 493/346, 349, 350, 351, 493/352, 381, 386, 390, 395, 967

[56] References Cited

U.S. PATENT DOCUMENTS

| | | | |
|---|---|---|---|
| 510,346 | 12/1893 | Keist | 242/60 |
| 1,333,940 | 3/1920 | Seymour | 83/400 |
| 1,509,835 | 9/1924 | Grossenbach | 403/387 |
| 1,958,132 | 5/1934 | Davis | 164/41 |
| 1,989,794 | 1/1935 | Duvall | 154/54 |
| 2,101,170 | 12/1937 | Engel | 271/76 |
| 2,107,462 | 2/1938 | Wood | 270/37 |
| 2,273,162 | 2/1942 | Willard | 271/2.1 |
| 2,425,123 | 8/1947 | Quayle et al. | 164/17 |
| 2,569,589 | 10/1951 | Trissell | 242/58 |
| 2,721,709 | 10/1955 | Auerbacher | 242/58 |
| 2,810,597 | 10/1957 | Poss | 287/103 |
| 2,860,703 | 11/1958 | O'Donnell | 164/42 |
| 2,882,802 | 4/1959 | Walker | 93/1 |
| 2,935,002 | 5/1960 | Robinson, Jr. | 93/1.1 |
| 3,069,107 | 12/1962 | Hirt | 242/79 |
| 3,089,716 | 5/1963 | Berkowitz | 287/54 |
| 3,136,462 | 6/1964 | Knutson | 225/24 |
| 3,238,852 | 3/1966 | Schur | 93/1 |
| 3,266,794 | 8/1966 | Weir | 270/81 |
| 3,283,874 | 11/1966 | Goreham | 197/126 |
| 3,323,983 | 6/1967 | Palmer et al. | 162/362 |
| 3,325,120 | 6/1967 | Brinkman | 242/86.5 |
| 3,377,224 | 4/1968 | Gresham et al. | 156/209 |
| 3,415,554 | 12/1968 | Papayoti | 287/189 |
| 3,509,797 | 5/1970 | Johnson | 93/1 |
| 3,603,216 | 9/1971 | Johnson | 93/1 |
| 3,606,410 | 9/1971 | Inserra | 287/127 |
| 3,613,522 | 10/1971 | Johnson | 93/1 |
| 3,650,419 | 3/1972 | Upshur et al. | 214/38 |
| 3,650,877 | 3/1972 | Johnson | 161/47 |
| 3,655,500 | 4/1972 | Johnson | 161/104 |
| 3,695,133 | 10/1972 | Finke | 83/204 |
| 3,735,445 | 5/1973 | Jurcak | 17/71 |
| 3,789,757 | 2/1974 | Motter et al. | 101/153 |
| 3,799,031 | 3/1974 | Hallenbeck et al. | 91/189 |
| 3,839,166 | 4/1975 | Behn | 270/83 |

(List continued on next page.)

*Primary Examiner*—William E. Terrell

*Attorney, Agent, or Firm*—Jones, Day, Reavis & Pogue

[57] ABSTRACT

A cushioning conversion machine for converting sheet-like stock material, such as a paper in multi-ply form, into cut sections of cushioning product is provided. The machine includes a stock supply assembly, a forming assembly, a pulling/connecting assembly and a cutting assembly, all of which are mounted on a machine frame. The machine frame includes a base plate having an upstream end and a downstream end, a first end plate extending generally perpendicular from the upstream end of the base plate and a second end plate extending generally perpendicular from the downstream end of the base plate. The frame base plate and the two frame end plates together form a "C" shaped structure. The stock supply assembly is mounted on the first frame end plate, the forming assembly is mounted on an intermediate portion of the frame base plate, the pulling/connecting assembly is mounted on an upstream side of the second end plate, and the cutting assembly is mounted on the downstream side of the second end plate. The machine may also include a post-cutting constraining assembly for circumferentially constraining the cut sections of the cushioning dunnage product and/or a pivot cover on one of the components of the forming assembly to aid in the manual threading of the machine.

30 Claims, 10 Drawing Sheets

U.S. PATENT DOCUMENTS 3,880,372 4/1975 White .................................... 242/55
3,898,920 8/1975 Zucker .................................... 93/1
4,025,198 5/1977 Ottaviano .................................... 93/1
4,059,256 11/1977 Palmer .................................... 270/52
4,198,888 4/1980 Gatt .................................... 83/467
4,237,776 12/1980 Ottaviano .................................... 493/382
4,258,846 3/1981 Campo .................................... 206/412
4,557,716 12/1985 Ottaviano .................................... 493/464
4,619,635 10/1986 Ottaviano .................................... 493/36
4,699,609 10/1987 Komaransky et al. .................................... 493/357
4,717,613 1/1988 Ottaviano .................................... 428/129
4,750,896 6/1988 Komaransky et al. .................................... 493/357
4,839,210 6/1989 Komaransky et al. .................................... 428/77
4,884,999 12/1989 Baldacci .................................... 493/439
4,937,131 6/1990 Baldacci et al. .................................... 428/131
4,968,291 11/1990 Baldacci et al. .................................... 493/354

DOWNSIZED CUSHIONING DUNNAGE CONVERSION MACHINE AND PACKAGING SYSTEMS EMPLOYING THE SAME

FIELD OF THE INVENTION

This invention relates as indicated to a cushioning dunnage conversion machine which converts sheet-like stock material, such as paper in multi-ply form, into cut sections of relatively low density pad-like cushioning dunnage product. More particularly, this invention relates to a conversion machine having a frame structure compatible with both horizontal and vertical positioning and which may therefore be employed in a variety of packaging systems. The invention also includes other improved features, such as a component to aid in the manual threading of the machine and a post-cutting constraining assembly for increasing the cushioning quality of the cut section.

BACKGROUND OF THE INVENTION

In the process of shipping an item from one location to another, a protective packaging material is typically placed in the shipping case, or box, to fill any voids and/or to cushion the item during the shipping process. Some conventional commonly used protective packaging materials are plastic foam peanuts and plastic bubble pack. These plastic materials are usually discharged from dispensers integrated into packaging systems. In many packaging systems the setup may allow, or even demand, horizontal dispersement of the plastic protective material. In other packaging systems, vertical dispersement of the protective material may be necessary to accommodate horizontal conveyor belts, which may be positioned very closely together. The plastic foam peanuts and plastic bubble pack and the dispensers of this plastic material have, for the most part, been compatible with a variety of packaging systems.

Despite this wide range of compatibility, conventional plastic protective materials are not without disadvantages. For example, one drawback of plastic bubble film is that it usually includes a polyvinylidene chloride coating. This coating prevents the plastic film from being safely incinerated, creating disposal difficulties for some industries. Additionally, both the plastic foam peanuts and the plastic bubble pack have a tendency to generate a charge of static electricity attracting dust from the surrounding packaging site. These plastic materials sometimes themselves produce a significant amount of packaging "lint." These dust and lint particles are generally undesirable and may even be destructive to sensitive merchandise such as electronic or medical equipment.

But perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

These and other disadvantages of conventional plastic packaging materials has made paper protective packaging material a very popular alterative. Paper is biodegradable, recyclable and renewable; making it an environmentally responsible choice for conscientious industries. Additionally, paper may be safely incinerated by the recipients of the products. Furthermore, paper protective packaging material is perfect for particle-sensitive merchandise, as its clean dust-free surface is resistant to static cling.

While paper in sheet form could possibly be used as a protective packaging material, it is usually preferable to convert the sheets of paper into a relatively low density pad-like cushioning dunnage product. This conversion may be accomplished by a cushioning dunnage machine, such as those disclosed in U.S. Pat. Nos. 3,509,798; 3,603,216; 3,655,500; 3,779,039; 4,026,198; 4,109,040; 4,717,613; and 4,750,896. The entire disclosures of these patents, which are owned by the assignee of the present application, are hereby incorporated by reference.

A conversion machine such as is disclosed in the above-identified patents includes a stock supply assembly, a forming assembly, and a pulling/connecting assembly. The stock assembly, which is located upstream from the forming assembly, supplies the sheet-like stock material from a stock roll to the forming assembly. The forming assembly causes inward rolling of the lateral edges of the sheet-like material into a generally spiral-like form whereby a continuous unconnected strip having two lateral pillow-like portions separated by a thin central band is formed. The pulling/connecting assembly is located downstream of the forming assembly and pulls the stock material from the stock supply assembly and through the forming assembly to form the unconnected strip. The pulling/connecting assembly also connects the strip along its central band to form a coined strip of pad-like cushioning material. A machine may also include a cutting assembly to cut this coined strip into cut sections of a desired length.

A conversion machine such as is set forth in the above cited patents is designed to be positioned in a generally horizontal self-standing manner. To this end, the machine includes a frame structure including legs for supporting the machine on the packaging site floor. The actual embodiments of the machines illustrated in these patents are approximately 42 inches high, 36 inches wide and 67 inches long. The stock supply assembly is mounted at an upper end of the frame which is about at waist-level of most workers, thereby permitting safe reloading of stock rolls onto the machine. The forming assembly and the pulling/connecting assembly are positioned at approximately the same level as the stock supply assembly so that the discharged coined strip of pad-like cushioning material may be easily manipulated by a worker. The motors powering the pulling/connecting assembly and/or the cutting assembly are mounted at the lower end of the frame, vertically offset from the stock supply assembly, the forming assembly and the pulling/connecting assembly.

With some packaging systems, this frame structure mounting arrangement may be compatible and may perhaps be efficient. However, many of the packaging systems currently using plastic protective packaging material require both horizontal and vertical positioning of the conversion machine. Thus a need remains for a conversion machine which may be easily positioned in both a horizontal and a vertical manner and thereby incorporated into a variety of packaging systems.

Due to the increased popularity of paper protective packaging material, other improvements of cushioning dunnage conversion machines are necessary or at least desirable. For example, because the pulling/ connecting assembly is located downstream of the forming assembly, a new roll of stock must be manually threaded through the various components of the forming assembly before automatic operation of the machine may begin. Features which would aid in the manual threading of the machine would be helpful in increasing the operating efficiency of the packaging system. Additionally, features which would further promote the cushioning quality of the resulting dunnage product are almost always desirable.

SUMMARY OF THE INVENTION

The present invention provides a cushioning dunnage conversion machine for converting sheet-like stock material, such as paper in multi-ply form, into cut sections of relatively low density pad-like cushioning product. The machine includes a stock supply assembly, a forming assembly, a pulling/connecting assembly and a cutting assembly, all of which are mounted on a machine frame. The machine frame includes a base plate having an upstream end and a downstream end, a first end plate extending generally perpendicular from the upstream end of the end plate and a second end plate extending generally perpendicular from the downstream end of the base plate. The frame base plate and the two frame end plates together form a "C" shaped structure; one side of the frame base plate being a smooth uninterrupted surface.

The stock supply assembly is mounted on the first frame end plate, the forming assembly is mounted on an intermediate portion of the frame base plate, the pulling/connecting assembly is mounted on an upstream side of the second end plate, and the cutting assembly is mounted on the downstream side of the second end plate. This mounting arrangement allows both horizontal and vertical positioning of the machine, making it compatible with a variety of packaging systems. Additionally, the machine is approximately one-third the size of the machines disclosed in the patents referenced above, while using the same size stock roll and producing the same size cut sections. Because of this reduction in size, the machine may be referred to as a "downsized" machine.

The second end plate is preferably made from aluminum to decrease weight without sacrificing strength. By mounting the pulling/connecting assembly to the upstream side and the cutting assembly to the downstream side of the second aluminum end plate, the manufacturing process is simplified, the weight of the unit is decreased, installation is easier and maintenance is easier and faster.

The present invention also provides a post-cutting constraining assembly for circumferentially constraining the cut sections of the pad-like cushioning dunnage product. The assembly is located downstream of the cutting assembly and is mounted on a box-like extension attached to the downstream end of the machine frame. The post-cutting constraining assembly is basically funnel shaped and has an upstream converging portion which tapers into a downstream tunnel portion. The converging portion is positioned between the downstream frame end plate and the box-like frame extension, while the tunnel portion extends through and beyond the frame extension in a down-stream direction.

The present invention also provides a pivot cover on one of the components of the forming assembly to aid in the manual threading of the machine. More specifically, the forming assembly includes a converging chute having a first portion and a second portion. The first portion is attached to the frame end plate while the second portion or "cover" is pivotally connected to the first portion. In this manner, the chute cover may be opened to manually thread the machine as is sometimes necessary when a new roll of stock material is installed. After the manual threading is complete, the chute cover may be closed to commence normal automatic operation of the machine.

The present invention also provides packaging systems including at least one cushioning dunnage conversion machine positioned in a vertical manner, a stock dispenser for dispensing stock to the stock supply assembly, a packaging surface, and a machine mounting stand for positioning the machine to receive stock from the stock dispenser and to direct the cut sections to the packaging surface. The machine may be positioned with its upstream end above its downstream end, or alternatively, with its downstream end above its upstream end. The packaging surface may be in the form of one or more conveyor belts, and the stock dispenser may comprise one or more stock supply carts.

The present invention provides these and other features hereinafter fully described and particularly pointed out in the claims, the following description and annexed drawings setting forth in detail a certain illustrative embodiments of the invention, these being indicative, however, of but one of the various ways in which the principles of the invention may be employed.

DETAILED DESCRIPTION

Figure 1:
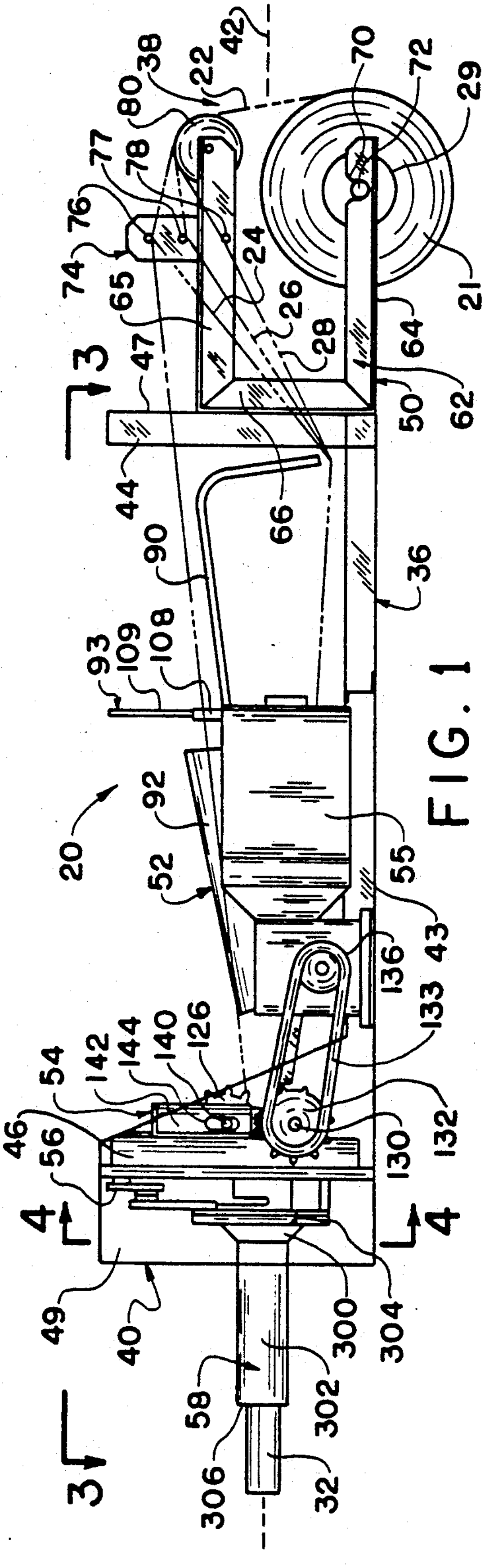
FIG. 1 is a side view of a cushioning dunnage machine according to the present invention, the machine being shown positioned in a horizontal manner and loaded with stock material with the external housing being removed for clarity of illustration.
Figure 2:
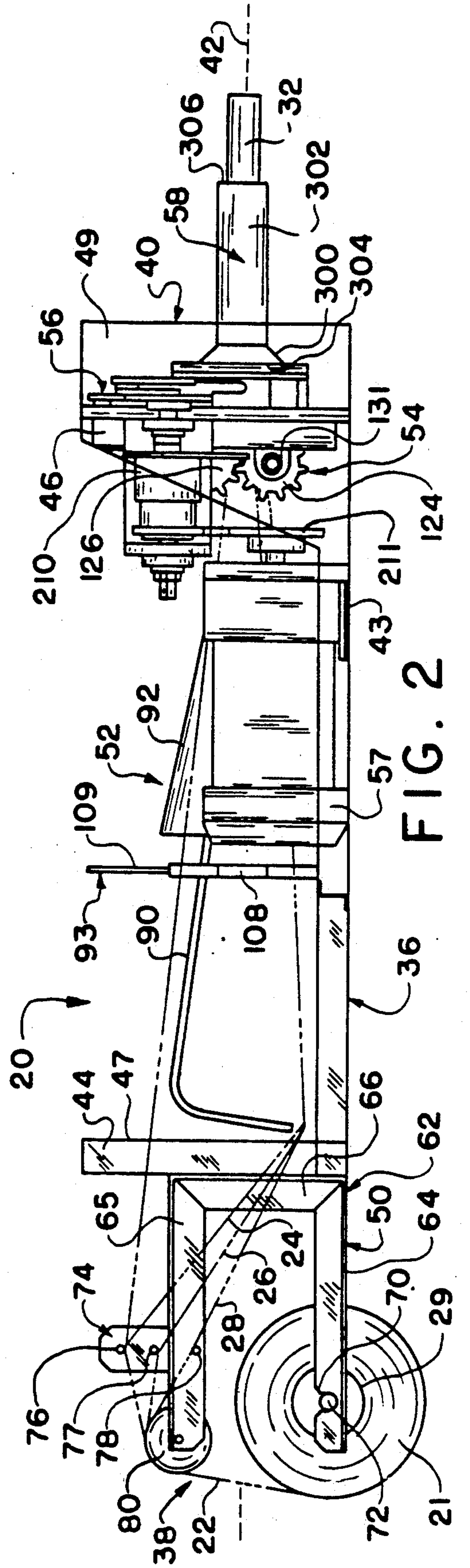
FIG. 2 is an opposite side view of the cushioning dunnage machine of FIG. 1.
Figure 3:
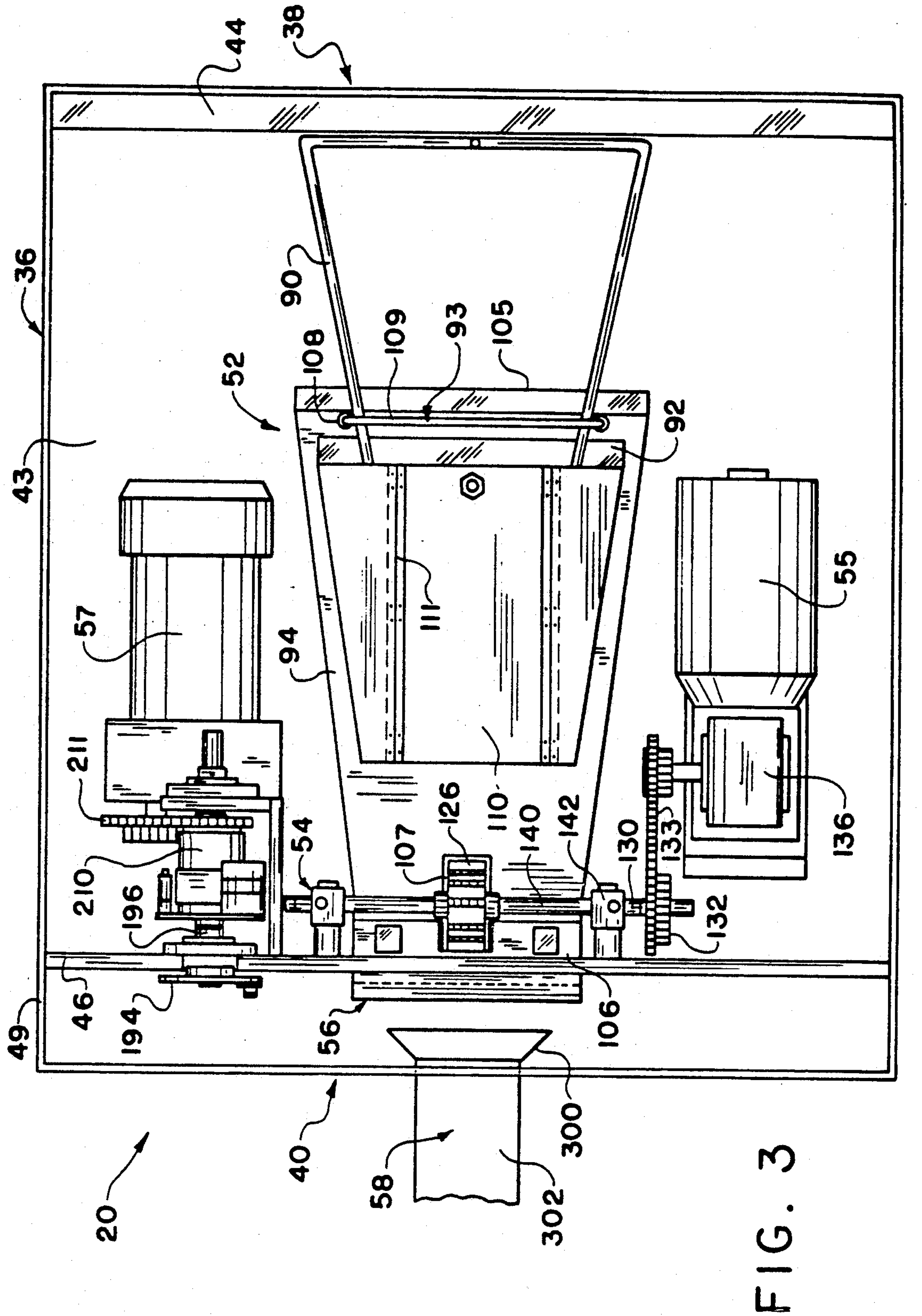
FIG. 3 is a top plan view of the cushioning dunnage machine of FIG. 1 without stock material loaded and as seen along line 3—3 in FIG. 1.

Referring now to the drawings in detail and initially to FIGS. 1 through 3, a cushioning dunnage conversion machine according to the present invention is indicated generally at 20. In FIGS. 1 and 2, the machine 20 is shown positioned in a horizontal manner and loaded with a roll 21 of sheet-like stock material 22. The stock material 22 may consist of three superimposed webs or layers 24, 26, and 28 of biodegradable, recyclable and reusable thirty-pound Kraft paper rolled onto a hollow cylindrical tube 29. A thirty-inch roll of this paper, which is approximately 450 feet long, will weigh about 35 pounds and will provide cushioning equal to approximately four fifteen cubic foot bags of plastic foam peanuts while at the same time requiring less than one-thirtieth the storage space.

The machine 20 converts this stock material 22 into a continuous unconnected strip having lateral pillow-like portions separated by a thin central band. This strip is connected or coined along the central band to form a coined strip which is cut into sections 32 of a desired length. The cut sections 32 each include lateral pillow-like portions 33 separated by a thin central band and provide an excellent relatively low density pad-like product which may be used instead of conventional plastic protective packaging material.

The machine 20 includes a frame, indicated generally at 36, having an upstream or "feed" end 38 and a downstream or "discharge" end 40. The terms "upstream" and "downstream" in this context are characteristic of the direction of flow of the stock material 22 through the machine 20. The frame 36 is positioned in a substantially horizontal manner whereby an imaginary longitudinal line or axis 42 from the upstream end 38 to the downstream end 40 would be substantially horizontal.

The frame 36 is formed from a base plate 43 and two end plates 44 and 46. The frame base plate 43 is generally rectangular and extends from the upstream end 38 to the downstream end 40 of the frame 36 in a generally horizontal plane. Although not perfectly apparent from the illustrations, the first or upstream frame end plate 44 may be more specifically described as a thin rectangular wall having a rectangular stock inlet opening 47 passing therethrough. The second or downstream frame end plate 46 is generally rectangular and planar and includes a relatively small rectangular outlet opening 48. The outlet opening 48 may be seen more clearly by briefly referring to FIG. 4.

The first frame end plate 44 extends generally perpendicular in one direction from the upstream end of the frame base plate 43. In the illustrated embodiment of FIGS. 1 and 2, this direction is upward. The second end plate 46 is preferably aluminum and extends in generally the same perpendicular direction from the downstream end of the frame base plate 43. In this manner, the frame 36 is basically "C" shape and one side of the frame base plate 43, which in this embodiment is the lower side, is a flat uninterrupted surface. The frame 36 also includes a box-like extension 49 removably attached to a downstream portion of the base plate 43. The entire frame cover can be enclosed by a sheet metal housing or cover to protect the components mounted therein and to provide a safety factor for people using the machine.

In the preferred embodiment, the frame 36 is dimensioned so that the length of the machine 20 is approximately 56 inches; the width of the machine is approximately 34 inches; and the height of the machine is approximately 12 inches. The "length" of the machine is measured from its downstream end to its upstream end and thus this is defined by the frame base plate 43 and the extension 49. The "width" of the machine is the transverse dimension of the frame base plate 43; and the "height" of the machine is defined by the frame end plates 44 and 46. These dimensions reflect a machine roughly one-third the size of conventional conversion machines.

The machine 20 further includes a stock supply assembly 50, a forming assembly 52, a gear assembly 54 powered by a gear motor 55 for pulling and connecting the paper dunnage, a cutting assembly 56 powered by a cutter motor 57, and a post cutting constraining assembly 58; all of which are mounted on the frame 36. The stock supply assembly 50 is mounted to an upstream side of the first frame end plate 44. The forming assembly 52 is located downstream of the stock supply assembly 50 and is mounted on an intermediate portion of the frame base plate 43. The gear assembly 54 is located downstream of the forming assembly 52 and is mounted on an upstream side of the second frame end plate 46. On the opposite downstream side of the frame end plate 46, the cutting assembly 56 is mounted. The movable blade of the cutting assembly is powered by a motor 57. The motors 55 and 57 are mounted on the frame base plate 43 at about the same level as the forming assembly 52 and on opposite sides thereof. Finally, the post-cutting constraining assembly 58 is located downstream of the cutting assembly 56 and is mounted on the box-like extension 49. The box-like extension 49 shields the cutting assembly 56 from outside particles and interference during normal operation, however because it is detachable it may be removed if necessary to adjust and/or repair the cutting assembly 56.

This particular mounting arrangement and/or this particular geometry and sizing of the frame 36 advantageously allows the machine 20 to be compatible with a variety of packaging systems. The machine 20 may be positioned in a horizontal manner as shown in FIGS. 1 and 2, by placing the machine on a flat horizontal surface. While the floor of a packaging site may be appropriate, other surfaces such as tables and work benches may be more desirable. The machine 20 may also be positioned in a vertical manner as shown in FIGS. 11, 12, 15, 16 and 17 whereby an imaginary longitudinal line from its upstream end to its downstream end would be substantially vertical. Additionally, two machines may be positioned symmetrically with respect to each other in close proximity as sometimes necessary to accommodate existing conveyor belts. (See FIGS. 11 and 17) Because of this flexibility, the machine 20 may accommodate packaging systems traditionally dominated by plastic protective material, such as those incorporating conveyor belts which are incompatible with conventional cushioning dunnage machines.

In operation of the machine 20, the stock supply assembly 50 supplies the stock material 22 to the forming assembly 52. The forming assembly 52 causes inward rolling of the lateral edges of the sheet-like stock material 22 to form the lateral pillow-like portions 33 of the continuous strip. The gear assembly 54 actually performs dual functions in the operation of the machine 20. One function is a "pulling" function in which the paper is drawn through the nip of the two cooperating and opposed gears of the gear assembly. The gear assembly 54 is the mechanism which pulls the stock material 22 from the stock roll 21, through the stock supply assembly 50, and through the forming assembly 52. The second function performed by the gear assembly 54 is a "coining" or "connecting" function. The gear assembly 54 connects the strip by the two opposing gears coining its central band passing therethrough to form the coined strip. As the coined strip travels downstream from the gear assembly 54, the cutting assembly 56 cuts the strip into sections 32 of a desired length. These cut sections 32 then travel through the post-cutting restraining assembly 58.

Turning now to the details of the various assemblies, the stock supply assembly 50 includes two laterally spaced brackets 62. The brackets 62 are each generally shaped like a sideways "U" and have two legs 64 and 65 extending perpendicularly outward from a flat connecting base wall 66. (See FIGS. 1 and 2.) For each bracket 62, the base wall 66 is suitably secured to the downstream side of the frame end plate 44, such that the leg 64 is generally aligned with the frame base plate 43. Both of the legs 64 have open slots 70 in their distal end to cradle a supply rod 72. The supply rod 72 is designed to extend relatively loosely through the hollow tube 29 of the stock roll 21. As the stock material 22 is pulled through the machine 20 by gear assembly 54, the tube 29 will freely rotate thereby dispensing the stock material 22. A pin (not shown) may be provided through one or both ends of the supply rod 72 to limit or prevent rotation of the supply rod 72 itself.

The other legs 65 of the U-brackets 62 extend from an intermediate portion of the frame end plate 44 and cooperate to mount a sheet separator, indicated generally at 74. The sheet separator 74 includes three horizontally spaced relatively thin cylindrical separating bars 76, 77 and 78. The number of separating bars, namely three, corresponds to the number of paper layers or webs of the stock material 22. The sheet separator 74 separates the layers 24, 26 and 28 of paper prior to their passing to the forming assembly 52. This "pre-separation" is believed to improve the resiliency of the produced dunnage product. Details of a separating mechanism similar to the separator 74 are set forth in U.S. Pat. No. 4,750,896; the entire disclosure of which has already been incorporated by reference.

The bracket legs 65 also cooperate to support a constant-entry bar 80 which is rotatably mounted on the distal ends of the legs. The bar 80 provides a nonvarying point of entry for the stock material 22 into the separator 74 and forming assembly 52, regardless of the diameter of the stock roll 21. Thus, when a different diameter roll is used and/or as dispensation of the stock material 22 from roll 21 decreases its diameter, the point of entry of the stock material 22 into the separator 74 remains constant. This consistency facilitates the uniform production of cut sections 32 of cushioning dunnage pad product. Details of a "roller member" or a "bar member" similar to the constant-entry bar 80 are set forth in U.S. Pat. No. 4,750,896.

After the stock material 22 is pulled from the stock roll 21 over the constant-entry bar 80 and through the sheet separator 74, it is pulled through the stock inlet opening 47 to the forming assembly 52. The forming assembly 52 is the actual "conversion" component of the machine 20 and includes a three-dimensional bar-like shaping member 90, a converging chute 92, a transverse guide structure 93 and a "coining" or guide tray 94. The stock material 22 travels between the shaping member 90 and the frame base plate 43 until it reaches the guide tray 94. At this point, the transverse guide structure 93 and the guide tray 94 guide the stock material 22 longitudinally and transversely into the converging chute 92. During this downstream travel, the shaping member 90 rolls the edges of the stock material 22 to form the lateral pillow-like portions 33 and the converging chute 92 coacts with the shaping member 90 to form the continuous strip of the desired geometry. As the strip emerges from the converging chute 92, the guide tray 94 guides the strip into the gear assembly 54.

The bar-like shaping member 90 may be supported by a vertical strap (not shown) attached to the distal ends of the frame end plates 44 and 46 and depending hangers (not shown). The hangers are preferably adjustable so that the position of the shaping member 90 relative to other components of the forming assembly 52, such as the converging chute 92, may be selectively varied. Further structural details of a shaping member 90 or "forming frame" are set forth in U.S. Pat. No. 4,750,896; the entire disclosure of which has already been incorporated by reference.

The guide tray 94 is directly mounted on the frame base plate 43; while the transverse guide structure 93 and the converging chute 92 are mounted on the guide tray 94. The guide tray 94 is trapezoidal in shape, as viewed in plan, having a broad upstream side 105 and a parallel narrow downstream side 106. The broad side 105 is positioned downstream of at least a portion of the shaping member 90. The narrow side 106 is positioned adjacent the outlet opening 48 in the frame end plate 46 and includes a rectangular slot 107 to accommodate the gear assembly 54. The guide tray is not positioned parallel with the frame base plate 43, but rather slopes away (upwardly in FIGS. 1 and 2) from the frame base plate 43 to the gear assembly 54.

The converging chute 92 is mounted on the guide tray 94 upstream of at least a portion of the shaping member 90 and downstream slightly from the broad side 105 of the guide tray 94. The transverse guide structure 93 is mounted on the guide tray 94 just upstream of the entrance mouth of the converging chute 92. The transverse guide structure 93 includes rollers 108 rotatably mounted on a thin U-bracket 109. The distal ends of the U-bracket 109 are secured to the guide tray 94. Except for this mounting arrangement, the transverse guide structure 93 is similar to the "rollers and wire frame" disclosed in U.S. Pat. No. 4,750,896.

With the guide tray 94 and the transverse guide structure 93 mounted in this manner, the stock material 22 travels over the guide tray 94, under the upstream end of the shaping member 90, between the rollers 108 of the transverse guide structure 93, and into the converging chute 92. The basic cross-sectional geometry and functioning of the converging chute 92 is similar to that of the converging member described in U.S. Pat. No. 4,750,896. However, one improvement over the conventional chutes is that a top portion of converging chute 92 is formed by a cover 110 pivotally connected by hinges 111 to the remaining or bottom portion of the chute. This arrangement is especially helpful during the initial "threading" of the machine 20. Because the gear assembly 54 is the "pulling" mechanism in the machine, a new roll 21 of stock material 22 must be manually threaded through the machine 20 before automatic operation of the machine may begin. The pivot cover 110 allows the converging chute 92 to be opened to aid in manually threading the stock material through the chute and closed when the machine is ready for automatic operation.

However, whether or not the converging chute 92 includes a pivot cover 110, the stock material 22 will emerge from the chute as the continuous unconnected strip. The emerging strip is guided to the gear assembly 54 by the narrow downstream end 106 of the guide tray 94, which extends from the outlet opening of the chute to the outlet opening 48 in the frame end plate 46. The gear assembly 54 includes loosely meshed horizontally arranged drive gear 124 and idler gear 126 between which the stock material 22 travels. When the gears 124 and 126 are turned the appropriate direction, which in FIG. 1 would be counterclockwise for gear 124 and clockwise for gear 126, the central band of the strip is grabbed by the gear teeth and pulled downstream through the nip of gears 124 and 126. This same "grabbing" motion caused by the meshing teeth on the opposed gears 124 and 126 simultaneously compresses or "coins" the layers of the central band together thereby connecting the same and forming the coined strip.

The drive gear 124 is positioned between the frame base plate 43 and the guide tray 94 and projects through the rectangular slot 107 in the guide tray 94. The gear 124 is fixedly mounted to a shaft 130 which is rotatively mounted to the upstream side of the frame end plate 46 by bearing structures 131. A sprocket 132 at one end of the shaft accommodates a chain 133 which connects the shaft 130 to a speed reducer 136. The speed reducer 136 acts as an interface between the gear assembly 54 and the gear motor 55 for controlling the rate of "pulling" of the stock material 22 through the machine 20. As is best seen in FIG. 1, the gear motor 55 and the speed reducer 136 are mounted on the frame base plate 43 at approximately the same level as the forming assembly 52.

The idler gear 126 is positioned on the opposite side of the guide tray 94 and is rotatively mounted on a shaft 140. Shaft brackets 142 attached to an upstream side of the frame end plate 46 nonrotatively support the ends of the shaft 140 in spring-loaded slots 144. The slots 144 allow the shaft 140, and therefore the idler gear 126, to "float" relative to the drive gear 124 thereby creating an automatic adjustment system for the gear assembly 54. A similar gear assembly or "connecting means" is described in U.S. Pat. No. 4,750,896.

Figure 4:
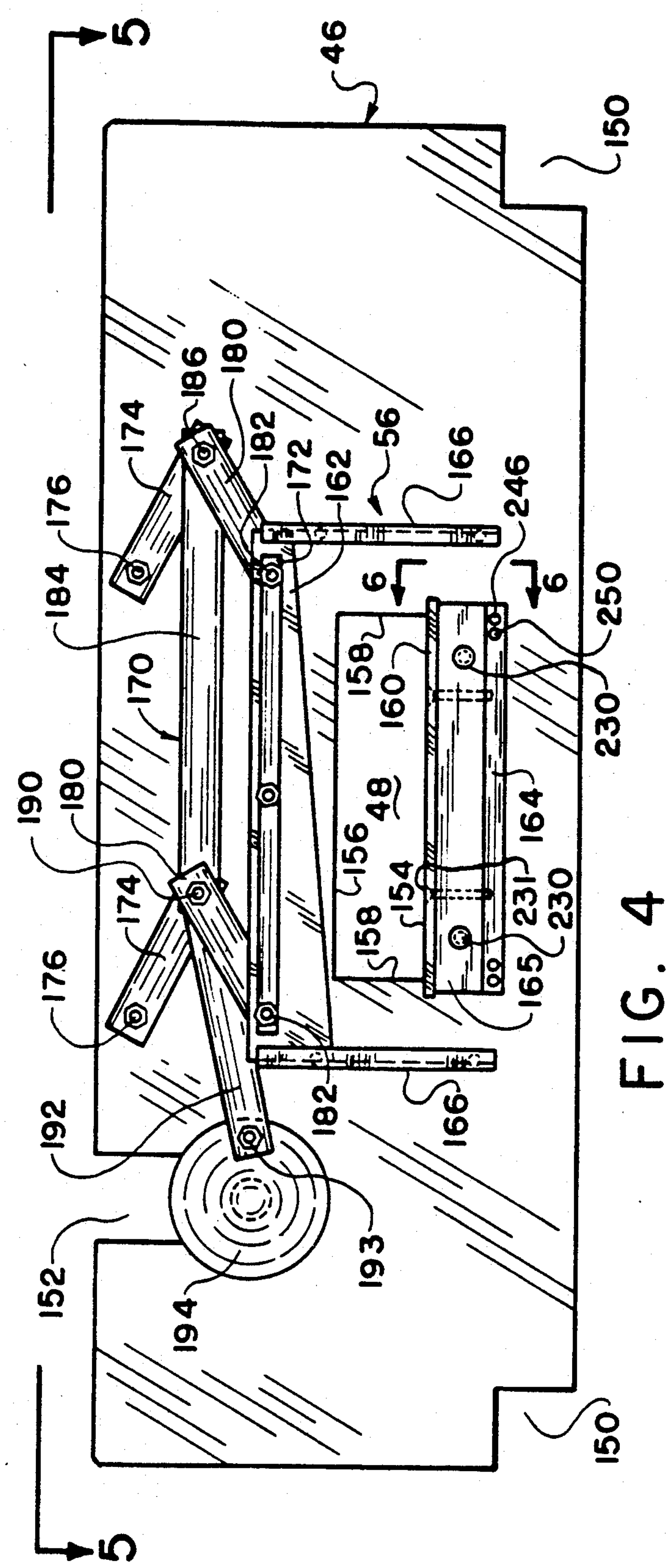
FIG. 4 is an isolated end view of the downstream side of the second or downstream frame end plate showing a cutting assembly attached thereto, as would be seen along line 4—4 in FIG. 1.

The gear assembly 54 transforms the unconnected strip into the coined strip and this strip travels through the outlet opening 48 in the frame end plate 46. The coined strip is then cut by the cutting assembly 56 into cut sections 32 of the desired length. Details of the cutting assembly 56 and the frame end plate 46 may be seen in FIGS. 4 and 5 where these components are shown isolated from the rest of the machine 20. As is best seen in FIG. 4, which shows the downstream side of the frame end plate 46, the roughly rectangular end plate 46 has two square notches 150 at the corners on its proximal side and an offset open slot 152 on its distal side. The terms "proximal" and "distal" in this context refer to the location of the side relative to the frame base plate 43. The square notches 150 coordinate with the frame base plate 43 for attachment purposes and the offset open slot 152 accommodates the drive of cutting assembly 56. Regarding the rectangular outlet opening 48, it is defined by a proximal side 154, a distal side 156 and two smaller lateral sides 158.

The cutting assembly 56 includes a stationary blade 160 and a shear or sliding blade 162, both blades being strategically positioned relative to the outlet opening 48. The blades 160 and 162 are the actual "cutting" elements of the cutting assembly 56 and coact in a guillotine fashion to cut the coined strip into the cut sections 32. The stationary blade 160 is fixedly (but adjustably) mounted on the frame end plate 46 by a stationary blade clamp 164 and stationary support bar 165. The shear blade is slidably mounted on the end plate within cutter guide bars 166.

The stationary blade clamp 164 is positioned so that the blade 160 is aligned with the proximal side 154 of the outlet opening 48. The cutter guide bars 166 are positioned beyond and parallel to the lateral sides 158 of the outlet opening 48. The bars 166 also extend beyond the proximal and distal sides 154 and 156 of the outlet opening 48. This positioning and sizing of the guide bars 166 allows the sliding blade 162 to travel from an open position completely clearing the outlet opening 48 as shown in FIG. 4 to a closed position beyond the stationary blade 160.

The sliding blade 162 is connected to a cutter linkage, indicated generally at 170, via a stabilizer bar 172. The cutter linkage 170 includes two laterally spaced arms 174 pivotally connected at 176 to the downstream side of second frame end plate 46; two laterally spaced arms 180 pivotally connected to the stabilizer bar at 182; and an arm 184. The arm 184 is pivotally connected at 186 to one set of arms 174 and 180, and is pivotally connected at 190 to the other set of arms 174 and 180. The arm 184 is also pivotally connected to a drive link 192 at 190.

The drive link 192 is connected at 193 to a tangential portion of a motion disk 194. A shaft 196 is connected at one end to the motion disk 194 and extends from the downstream side of the frame end plate 46, through the open offset slot 152 to the upstream side of the plate 46. The opposite end of the shaft 196 is connected to a clutch assembly 210 which is mounted on the upstream side of the frame end plate 46. The clutch assembly is connected to the output shaft of cutter motor 57 by an endless drive chain 211. The clutch assembly 210 serves as an interface between the shaft 196 (and therefore the motion disk 194) and the cutter motor 57 to change and/or regulate the rotation of motion disk 194. As the motion disk 194 is rotated, the position of the drive link 192 will be varied to drive the linkage assembly 170 to move the sliding blade 162 to and fro within the guide bars 166 at a desired interval. One rotation of the motion disk 194 will move the sliding blade through one cycle of making a cutting stroke through the coined strip and a return stroke to the open position shown in FIG. 9.

As the sliding blade 162 travels to and fro, the coined strip will be cut by a "shearing" action between the stationary blade 160 and the sliding blade 162. To accomplish this shearing action, the blades are not exactly aligned. Instead, the sliding blade 162 is offset a slight distance downstream from the stationary blade 160 and the magnitude of this offsetting distance is critical to the operation of the cutting assembly 56. If the distance is too great, a "gap" will be created between the blades and the coined strip will not be cut properly. If the distance is too small, the blades may be damaged during the cutting process. The dimensional range between a "too great" and "too small" setting is about 0.005 inches.

Figure 5:
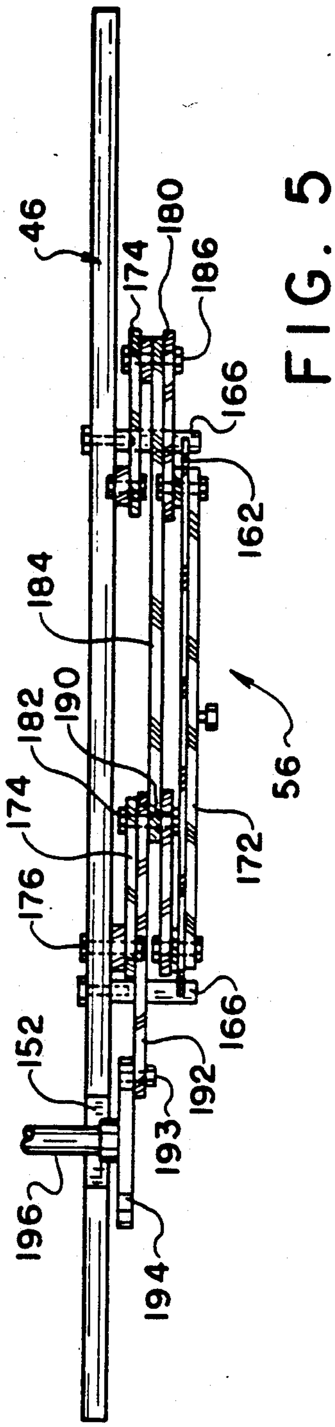
FIG. 5 is a plan view of the downstream frame end plate and the cutting assembly as seen along line 5—5 in FIG. 4 with the cover.
Figure 6:
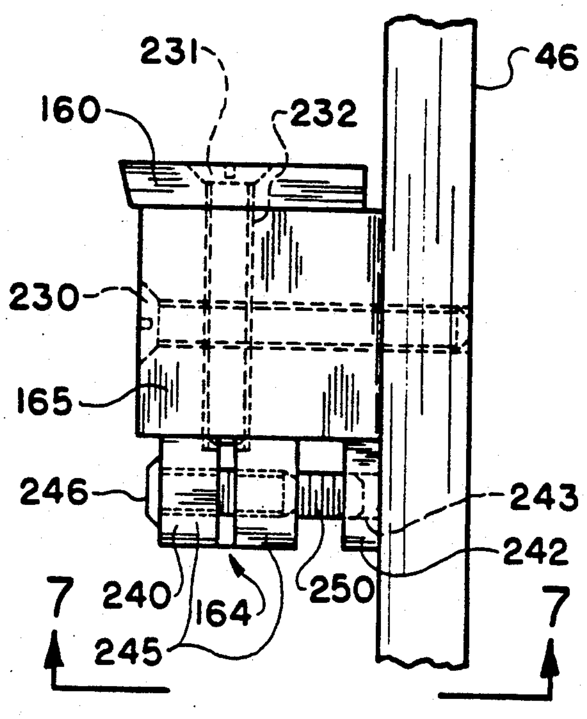
FIG. 6 is an enlarged view of a fixed blade adjustment portion of the cutting assembly and the downstream frame end plate as seen along line 6—6 in FIG. 4.

To insure the proper positioning of the blades 160 and 162 relative to each other; the stationary blade 160 may be mounted to the frame end plate 46 in a manner making manual adjustments possible. One such manual manner is shown in FIGS. 4 and 5 and in further detail in FIGS. 6 and 7. In the illustrated manual mounting arrangement, the support bar 165 is sandwiched between the stationary blade 160 and the blade clamp 164 and is unadjustably or fixedly secured to the frame end plate 46 by fasteners 230. (FIGS. 4 and 6.) The stationary blade 160 is attached to the blade clamp 164 by fasteners 231 which travel through openings 232 in the support bar 165. The fasteners 231 and the openings 232 are dimensioned to create a slight clearance between a fastener 231 and an opening 232 whereby the openings may be viewed as "enlarged." The magnitude of this clearance would be in the order of 0.005 inch and accordingly difficult to reflect in the illustrations. Once the fasteners 231 are tightened, the blade 160 will be fixedly positioned relative to the blade clamp 164 irrespective of the enlarged openings 232.

To adjust the position of the stationary blade 160, the blade clamp 164 includes a moving clamp part 240 adjustably mounted to a pair of mounting clamp parts 242. The block-shape mounting clamp parts 242 are fixedly secured to the frame end plate 46 and each part has a threaded opening 243. The stationary blade 160 is attached to the moving clamp part 240 and thus adjustment of the moving clamp part 240 relative to the mounting clamp parts 242 results in adjustment of the blade 160 relative to the frame end plate 46 to the extent permitted by the clearance between fasteners 231 and openings 232.

Figure 7:
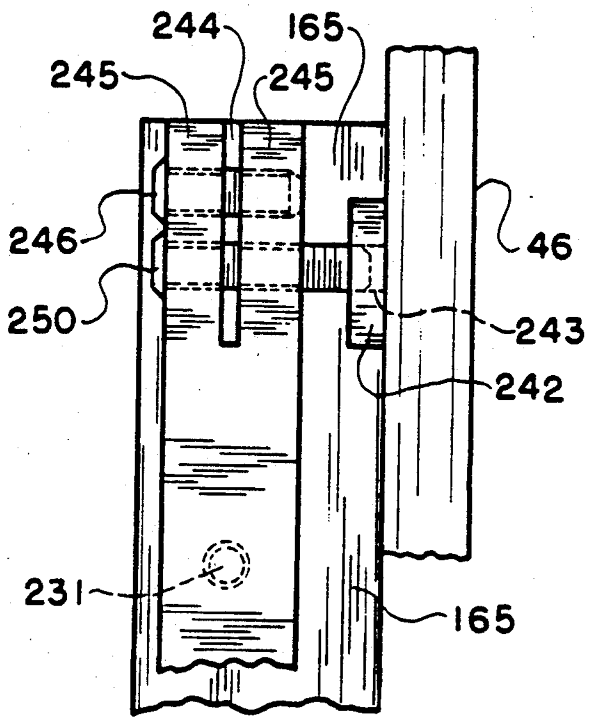
FIG. 7 is another bottom plan view of the fixed blade adjustment portion of the cutting assembly and the downstream frame end plate as seen along line 7—7 in FIG. 6.

The moving clamp part 240 is a bar-shape piece having an open slot 244 forming two thongs 245 at each end (see FIGS. 6 and 7). Lock screws 246 may be inserted through outer openings in the clamp part 240 to brace the thongs on each end together. Adjustment screws 250 extending through inset openings 252 secure the moving clamp part 240 to the mounting clamp parts 242. The inset openings 252 are arranged so that adjustment screws 250 may mate with the threaded openings 243 in the mounting clamp parts 242.

The adjustment screws 250 and the openings 252 are dimensioned to permit a certain amount of play between these components so that the moving clamp part 240 may be adjusted relative to the mounting clamp parts 242. An adjustment of the moving clamp part 240 results in corresponding movement of the stationary blade 160 whereby the cutting assembly 56 may be manually adjusted. Because the fasteners 231 connecting the stationary blade 160 to the moving clamp part 240 extend through the enlarged openings 232 in the blade support bar 165, the movement of the clamp part 240 and the stationary blade 160 is limited by the size of the openings 232. The slight clearance between the fasteners 231 and the openings 232 should therefore be dimensioned to allow the necessary adjustments in the range of 0.005 inches.

To lock the fixed blade in the selected "adjusted" position, the lock screws 246 are rotated to draw the thongs 245 together to decrease the width of the gap therebetween. By decreasing this gap, the thongs bind the adjustment screws 250 precluding rotation thereof, thereby to lock the fixed blade 160 in the selected position.

Figure 8:
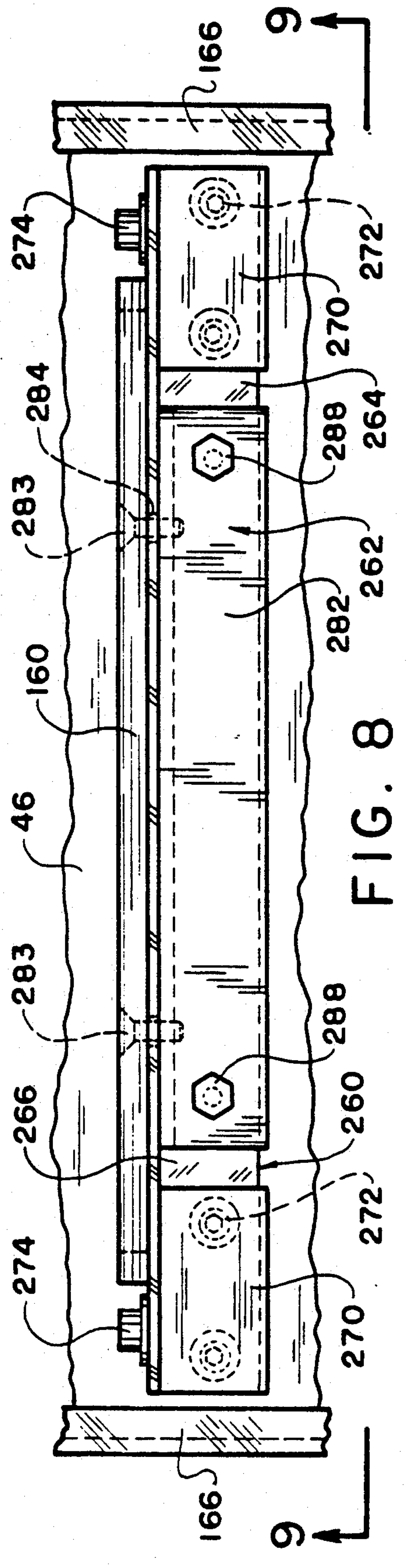
FIG. 8 is an enlarged view of another embodiment of a fixed blade adjustment portion mounted on the end plate.
Figure 9:
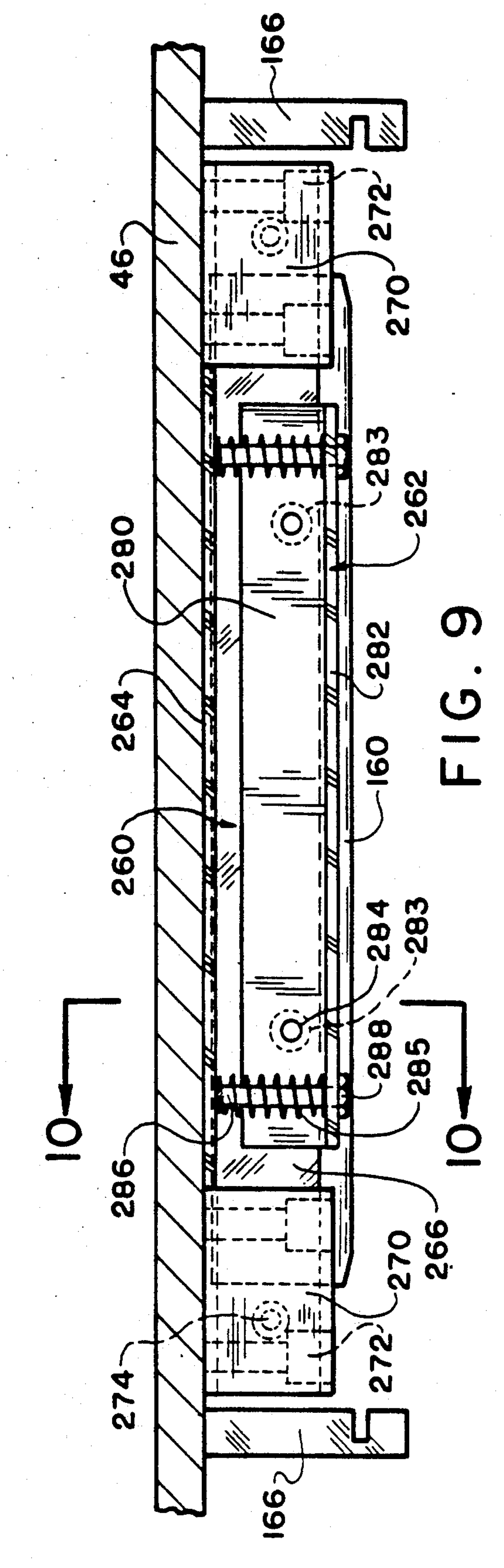
FIG. 9 is another bottom plan view of the end plate and fixed blade adjustment of the cutting assembly of FIG. 8, as would be seen along line 9—9 in this Figure.
Figure 10:
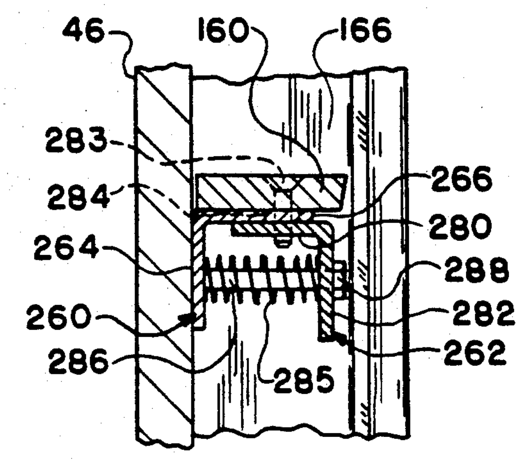
FIG. 10 is a vertical sectional view of the end plate and the cutting assembly of FIG. 8 as would be seen along line 10—10 in FIG. 9.

Another manner of mounting the stationary blade 160 to insure proper blade positioning during the shearing action is shown in FIGS. 8, 9 and 10. In the illustrated mounting arrangement, the stationary blade 160 is spring-loaded toward the sliding blade 162 so that the cutting assembly 56 is "self-adjusting." During the cutting process, the sliding blade 162 will urge the stationary blade 160 inwardly (upstream) to provide the necessary clearance between the blades. The stationary blade 160 is effectively adjusted on each cutting stroke thereby minimizing blade damage caused by inadequate clearance and improper cutting caused by overly separated blades.

This "self-adjustment" of the cutting assembly 56 is accomplished by employing a mounting angle bracket 260 and a resilient angle bracket 262, each having a pair of perpendicular walls. The mounting angle bracket 260 has one wall 264 positioned parallel and adjacent to the frame end plate 46 and another perpendicular wall 266 extending outwardly (downstream). Support blocks 270 are positioned at each end of the mounting angle bracket 260 and fasteners 272, which extend through the blocks 270, wall 264, and the end plate 46, fixedly secure the blocks 270 and the mounting angle bracket 260 to the second frame end plate. The outwardly extending wall 266 of mounting angle bracket 260 is also secured to each of the support blocks 270 by fasteners 274.

The resilient angle bracket 262 has one wall 280 positioned adjacent the mounting bracket wall 266 and another perpendicular wall 282 positioned opposite the bracket wall 264. (See FIG. 10) The resilient angle bracket 262 is secured to both the mounting angle bracket 260 and the stationary blade 160 by two laterally spaced fasteners 283, with the brackets being arranged so that the blade 160 is aligned with the proximal side 154 of the outlet opening 48. The fasteners 283 extend through aligned openings in the stationary blade 160, the mounting bracket wall 266, and the resilient bracket wall 280. The aligned openings 284 in the mounting bracket wall 266 are oversized or elongated when compared to the fasteners 283 creating a clearance between the fasteners 283 and the openings 284. Bushings (not shown) may be used lock the stationary blade 160 to the resilient angle bracket 262.

The resilient angle bracket 262 is urged away or downstream from the mounting angle bracket 260 and the frame end plate 46 by springs 285. The springs 285 are supported on screws 286 which are attached at one end to the mounting bracket wall 264. The opposite ends of the spring support screws 285 extend through openings in the resilient bracket wall 280 and are capped by nuts 288. These openings in the wall 280 are dimensioned to permit slidable movement between the resilient angle bracket 262 and the screws 286 as the springs are compressed or expanded during operation of the cutting assembly 56.

The stationary blade 160 is attached to the resilient angle bracket 262 by fasteners 283 whereby the springs 285 also urge the stationary blade 160 in the same downstream direction towards the sliding blade 162. The movement of both the resilient angle bracket 262 and the stationary blade 160 in either direction is limited by the ends of the oversized openings 284 in the mounting bracket 260 through which the fasteners 283 extend. Accordingly, these openings should be dimensioned to provide the necessary play between the blades 160 and 162.

Thus both manual and "self" adjusting cutting assemblies may be used to properly position the blades 160 and 162. However, whatever type of cutting assembly 56 is used, the coined strip is divided into cut sections 32 of the desired length. These cut sections 32 then travel downstream to the post-cutting constraining assembly 58 which helps the cut sections to retain their desired geometry and thereby improve their cushioning capacity. Referring back to FIGS. 1–3, the post-cutting constraining assembly 58 is located downstream of the cutting assembly 56 and is mounted on the box-like extension 49 of the frame 36.

The post-cutting constraining assembly 58 is basically funnel-shaped and includes an upstream converging portion 300 which tapers into a downstream rectangular tunnel portion 302. The converging portion 300 is located between the downstream frame end plate 46 and the extension 49, while the tunnel portion 302 extends through and beyond the frame extension 49. The post-cutting constraining assembly 58 is positioned so that its inlet 304 is aligned with the outlet opening 48 of the end plate 46. The downstream outlet 306 of the post-cutting constraining assembly 58 is also preferably aligned with the outlet opening 48 and also the inlet 304.

A cut section 32 will be urged or pushed downstream into the inlet 304 of assembly 58 by the approaching coined strip. The converging portion 300 smoothly urges the section 32 into the tunnel portion 302. As the cut section 32 passes through the tunnel portion 302, it is generally constrained circumferentially and longitudinally guided which are believed to improve its cushioning quality.

A cut section 32 emerging from the post-cutting constraining assembly 58 may be directed to a desired packing location, the conversion of stock material 22 to cut sections 32 of relatively low density pad-like cushioning dunnage product now being complete. One may appreciate that these cut sections 32 are produced by a machine 20 which is compatible with both horizontal and vertical positioning. Other features, such as the pivot cover 110 on the converging chute 92 and the post-cutting constraining assembly 58 improve the operating efficiency of the machine and/or the cushioning quality of the product.

Turning now to FIGS. 11–17, various packaging systems employing one or more machines 20 are shown. In the machines 20 shown in these systems, the frame 36 is positioned in a substantially vertical manner whereby the imaginary longitudinal line 42 drawn from the upstream end 38 to the downstream end 40 would be substantially vertical. Additionally, the stock supply assembly 50 includes "L" shaped brackets 307, instead of the "U" shaped brackets 62 employed in the machine illustrated in FIGS. 1 and 2. In most packaging systems in which the machine 20 is vertically positioned, the stock roll 21 will be mounted at a remote location. For this reason, the one leg 64 of the "U" shaped bracket 62 is unnecessary. However, "U" shaped brackets could be used in a vertically mounted machine and the stock roll 21 could be mounted in the manner shown in FIGS. 1–3. Additionally, even if the stock roll 21 was mounted remote from the machine 20, "U" shaped brackets could still be used by mounting a second constant-entry bar 80 on the distal ends of the unoccupied legs 64.

Be that as it may, in each of the packaging systems illustrated in FIGS. 11–17, the stock supply assembly 50 includes two "L" shaped brackets 307. The "L" shaped brackets 307 each have one leg 308 extending perpendicularly outwardly from one end of a flat wall 309. The flat walls 309 are suitably secured to the upstream side of the frame end plate 44 such that their free ends are aligned with frame base plate 43. The legs 308 extend from an intermediate portion of the frame end plate 44 and cooperate to mount the sheet separator 74 and the constant-entry bar 80.

Perhaps at this point it should also be noted that the machines 20 illustrated in these systems include a cover 310 removably placed on the machine to improve its exterior appearance and/or to protect its interior components. The cover 310 includes three sides: one longitudinal side 312 and two transverse sides 314. The longitudinal side 312 is positioned parallel to the frame base plate 43 and extends between the distal sides of the frame end plates 44 and 46. The transverse sides 314, which project perpendicularly from opposite edges of the longitudinal side 312, extend between the lateral sides of the frame end plates 44 and 46. Aside from these differences, however, the machine 20 employed in the packaging systems shown in FIGS. 11–17 may be mechanically and structurally identical to the machine 20 illustrated in FIGS. 1–10 and described above.

Figure 11:
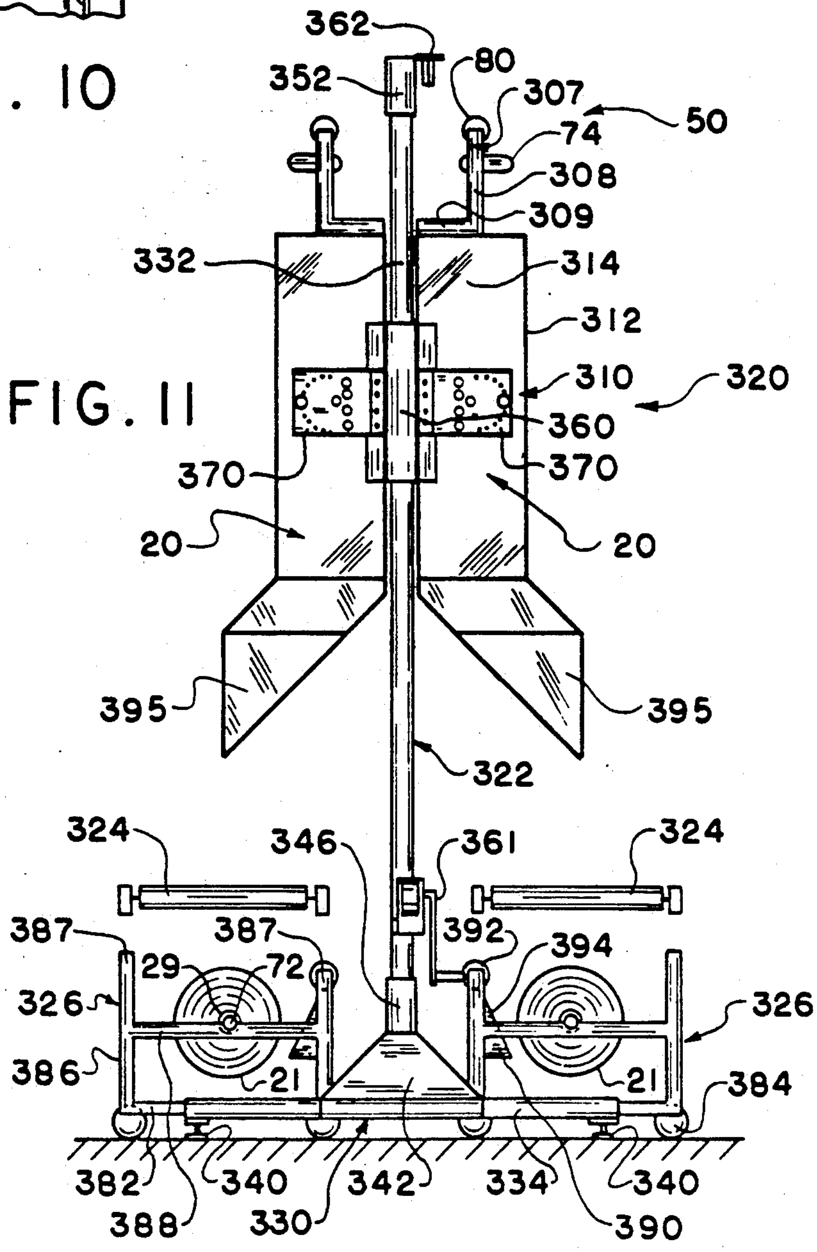
FIG. 11 is a side view of a packaging system according to the present invention employing two cushioning dunnage machines, the machines being mounted in a vertical manner on a machine mounting stand.
Figure 12:
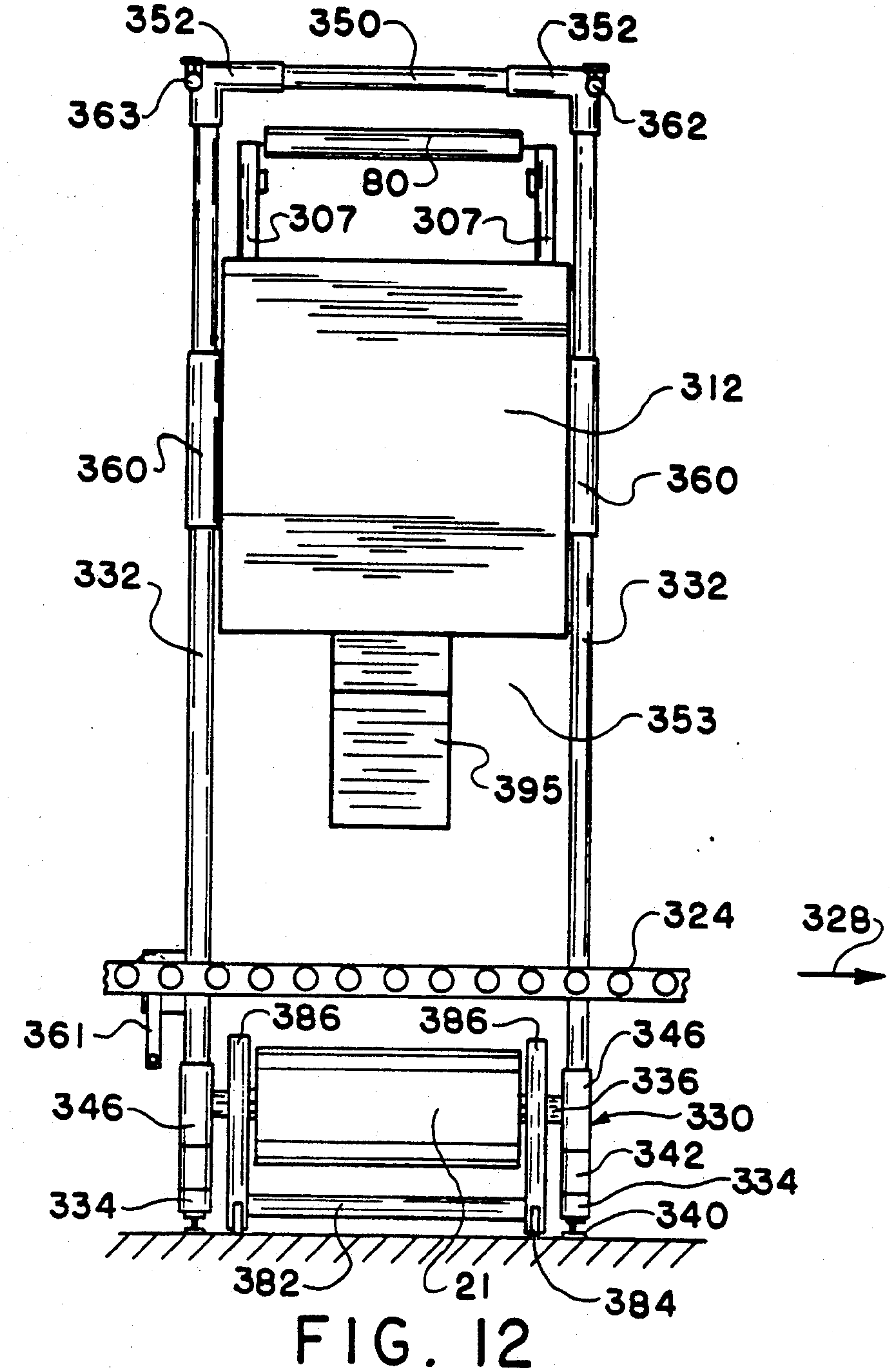
FIG. 12 is a front view of the packaging system of FIG. 11.

Addressing now the particular packaging systems, one packaging system 320 according to the present invention is shown in FIGS. 11 and 12. The packaging system 320 employs two cushioning dunnage machines 20 orientated so that their upstream ends are positioned above their downstream ends. The system 320 also includes a machine mounting stand 322 for mounting the machines 20 in the desired orientation, a packaging surface in the form of two parallel closely spaced independently supported conveyer belts 324, and a stock dispenser comprising two stock supply carts, indicated generally at 326. The components of the packaging system 320 are coordinated so that stock rolls 21 may be mounted on the stock supply carts 326, stock material 22 may be fed into the upstream end of the machine 20, and the converted cut sections 32 of cushioning material may be dropped into shipping cases (not shown) traveling on the conveyer belts 324 in the direction symbolized by arrow 328.

The machine mounting stand 322 includes a floor support, indicated generally at 330, and two vertical posts 332 extending upwardly therefrom. The floor support 330 is generally "H" shaped when viewed from the front and includes two side members 334 extending outwardly from both sides of an elevated lower cross bar 336. Leveling feet 340 on the distal ends of the side members 334 allow for adjustment or leveling of the machine mounting stand 322 on the floor of the packaging site. The lower cross bar 336 is positioned between the conveyor belts 324 in a direction parallel to the flow direction 328 whereby half of each of the side members 334 is positioned beneath one of the conveyor belts 324.

The side members 334 and the lower cross bar 336 together define three sides of a rectangular space under each conveyor belt 324 into which the stock supply carts 326 may neatly fit.

The vertical posts 332 are secured to the side members 334 by two triangular braces 342 and extend upwardly between the conveyor belts 324. The lower cross bar 336 is secured to the vertical posts 332 by T-braces 346 located just above the triangular braces 342. The vertical posts 332 are further braced together by a top cross bar 350 attached by L-braces 352 to the top ends of the vertical posts. As is best seen in FIG. 12, the vertical posts 332, the lower cross bar 336 and the top cross bar 350 together define a rectangular open space 353 in a substantially vertical plane between the machines 20.

The machines 20 are mounted on the vertical posts 332 by sliders, indicated generally at 360, whereby the machines may be vertically adjusted on the machine mounting stand 322. In this manner, the packaging system 320 may be modified to accommodate conveyor belts of various heights, different shaped shipping cases and/or diverse density cushioning products. A cable (not shown), which is connected to a winch 361 and pulleys 362 and 363, controls the position of the sliders 360 on the vertical posts 332. The winch 361 is mounted on one of the vertical posts 332 at floor level for convenient access while the pulleys 362 and 363 are positioned at the top ends of the vertical posts 332. The vertical positioning of the machines 20 may be adjusted by turning the winch 361 and the pulleys 362 and 363 will assure equal vertical adjustment of the two sliders 360.

Figure 13:
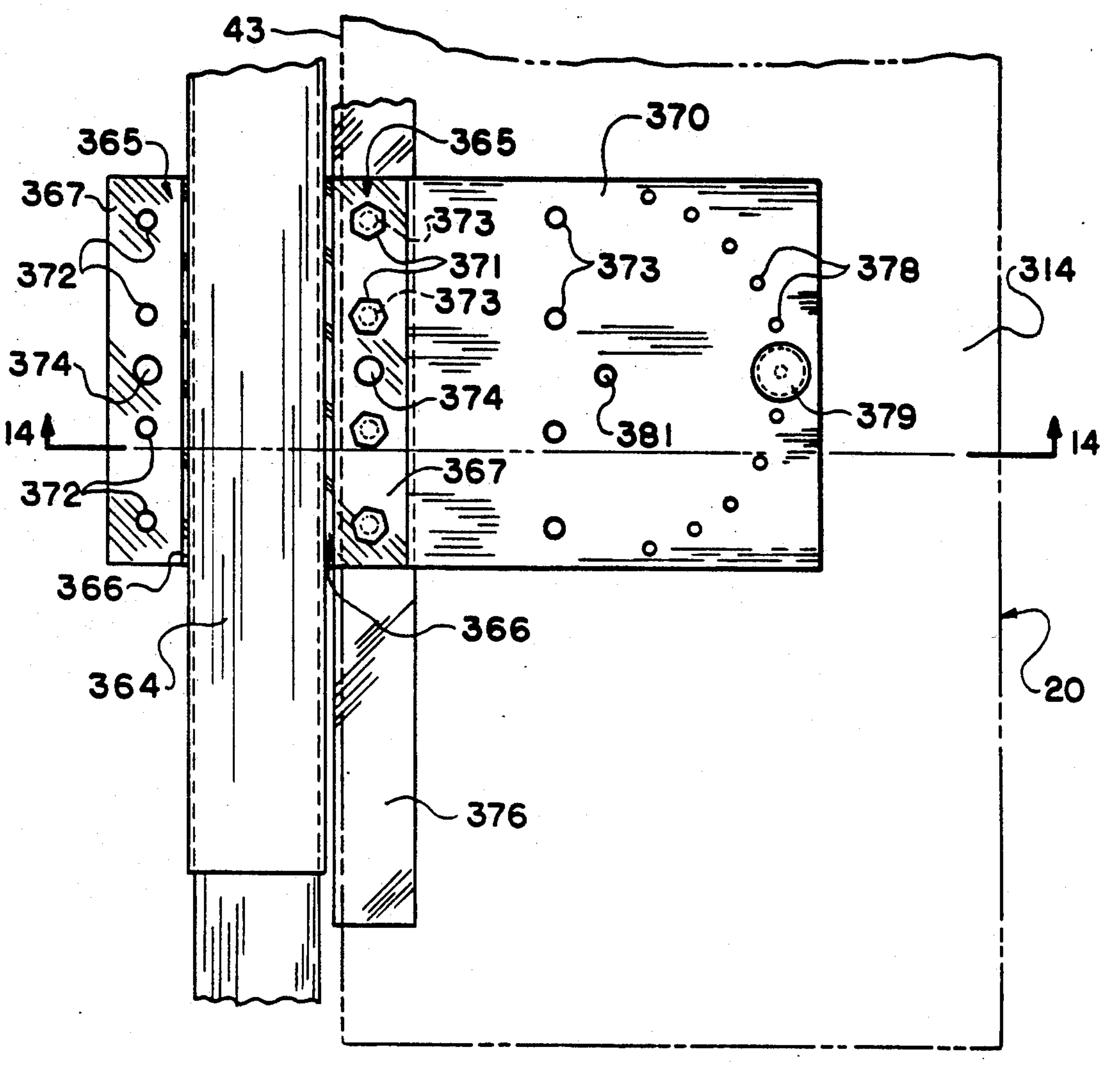
FIG. 13 is an enlarged view of some of the components used to mount the machines onto the machine mounting stand in the packaging system of FIG. 11.
Figure 14:
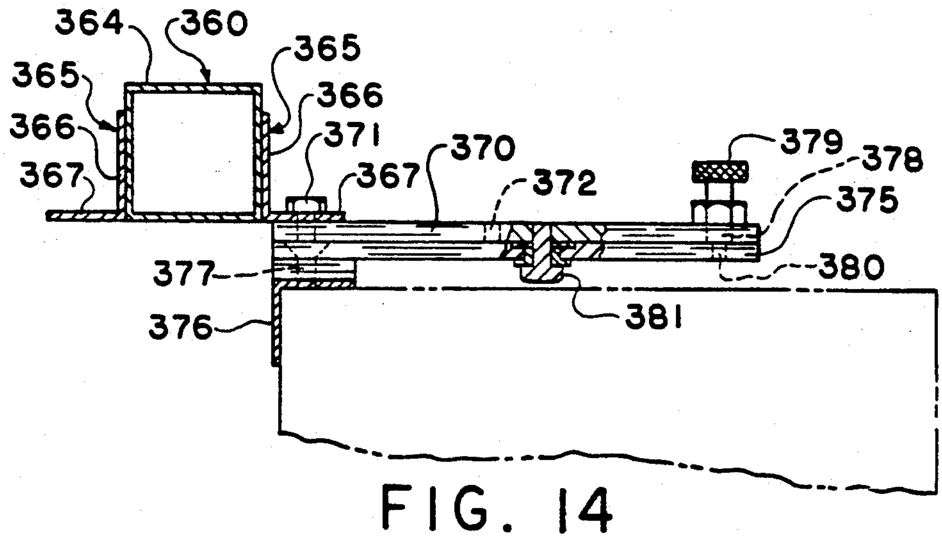
FIG. 14 is a sectional view of the mounting components as seen along line 14—14 in FIG. 13.

The sliders 360 and the actual attachment of the sliders 360 to the machines 20 and the vertical posts 332 are shown in detail in FIGS. 13 and 14. In addition to allowing vertical adjustments, this attachment arrangement allows horizontal or "tilt" adjustments of the machines 20 relative to the machine mounting stand 322 whereby two-dimensional fine-tuning of the packaging system 320 is possible.

Each of the sliders 360 has a central square channel 364 dimensioned to encase one of the vertical posts 332. Two side angle brackets, indicated generally at 365, having perpendicular walls are attached to opposite sides of the square channel 364. More particularly, one wall 366 of each angle bracket 365 is secured to one side of the channel 364, while each of the other walls 367 extends outwardly therefrom in opposite directions. The outwardly extending wall 367 on one bracket is attached to a swivel plate 370 by fasteners 371. The fasteners 371 extend through four openings 372 in the wall 367 and aligning openings 373 located along one edge of the swivel plate 370. The swivel plate 370 also includes a second set of openings 373 which are located along a central band of the swivel plate 370 and the side angle brackets 365 include a fifth larger central opening 374 between the openings 372. The second set of openings 373 and the central opening 374 permit this mounting arrangement to accommodate other packaging systems as will be explained in more detail below.

The swivel plate 370 is selectively secured to a stop plate 375 which is almost identical in shape to the swivel plate 370 and thus it is hidden in FIG. 13. The stop plate 375 is attached at one edge to a machine mount angle bracket 376 by fasteners 377, the bracket 376 being fixedly secured to a corner of the machine 20. As is best seen in FIG. 13, the swivel plate 370 has a semi-circular array of openings 378 through which a spring plunger 379 may be inserted and received in an opening 380 in the stop plate 375. The stop plate 375 may be additionally rotatively attached to the swivel plate 370 by a pivot fastener 381. In the illustrated embodiment, the spring plunger 379 is inserted through the central opening 378, thus positioning the machine in an almost exact vertical manner. However, the spring plunger 379 may be removed to allow the stop plate and machine 20 to be pivoted about pivot fastener 381. The spring plunger may then be selectively inserted through any of the offset openings 378 aligned therewith whereby the stop plate 375 and the attached machine would be tilted. This ability to tilt the machines 20 allows a "fine tuning" of packaging system 320.

While in FIGS. 13 and 14, only one swivel plate 370 and machine 20 are shown attached to the slider 360, the second machine of the packaging system 320 would be mounted symmetrically to the other side angle bracket 365 by its own swivel plate 370 and other associated components. The vertical adjustment of the machines 20 would always be the same because they share the sliders 360. However, the tilt of one of the machines 20 could be set independently of the other machine by adjusting the corresponding spring plunger 379 position in the swivel plate 370. The magnitude of tilting adjustment which would be possible in the packaging system 320 would be limited by the thickness of the rectangular space 353 between the machines 20.

However, whatever attachment arrangement is used to secure the machines 20 on the machine mounting stand 322, the machines 20 receive stock material 22 from the stock dispenser, or the stock supply carts 326. As indicated above, the stock supply carts 326 are located beneath the conveyor belts 324 in the rectangular spaces defined by the side members 334 and the lower cross bar 336 of the machine mounting stand 322. Each of the stock supply carts 326 includes a rectangular bottom tray 382 having rollers 384 pivotally attached to each of its four corners. The rollers 384 make the carts 326 mobile allowing them to be conveniently rolled in and out from the under the conveyor belt 324 for loading/unloading purposes.

Each stock supply cart 326 further includes two "H" shaped side members 386 each having two vertical legs 387 extending from two adjacent corners of the bottom tray 382 and a connecting arm 388. The connecting arms 388 include a central recess in which a supply rod 72 extending through the hollow tube 29 of the stock roll 21 may be cradled. During operation of the machine 20, the stock material 22 will be pulled by the gear assembly 54 from the stock roll 21 through the open space 353 between the machines 20 to the stock supply assembly 50 located at the top of the machine.

To guide the stock material in its upward path to the stock supply assembly 50, the cart 326 includes a deflector 390 and a guiding rod 392. The deflector 390 is attached to and extends between an intermediate portion of two adjacent vertical legs 387 which are not part of the same "H" shaped side member 386. The deflector 390 is shaped basically like a prism and has an upwardly sloping side 394 positioned adjacent to the stock roll 21. The guiding rod 392 is rotatively attached to and extends between an upper portion of the same vertical legs 387 to which the deflector 390 is attached. As is best seen in FIG. 11, when the cart 326 is properly positioned beneath the conveyor belt 324 these two vertical legs 387 are located closest to the lower cross bar 336 of the machine mounting stand 322. In operation, the stock material 22 follows the deflector sloping side 394 upwardly and around the guiding rod 392 to ensure a smooth entry of stock material into the open space 353.

The stock material 22 travels from the open space 353 to the stock supply assembly 50, through the forming assembly 52, the gear assembly 54 and the cutting assembly 56 to be converted into cut sections 32. The cut sections 32 travel through the post-cutting constraining assembly 58 which in the illustrated embodiment is surrounded by a pad chute 395. The pad chute 395 is attached to the downstream end of the frame 36 and acts an external guide assembly for directing the cut sections 32 to the desired packing location.

Figure 16:
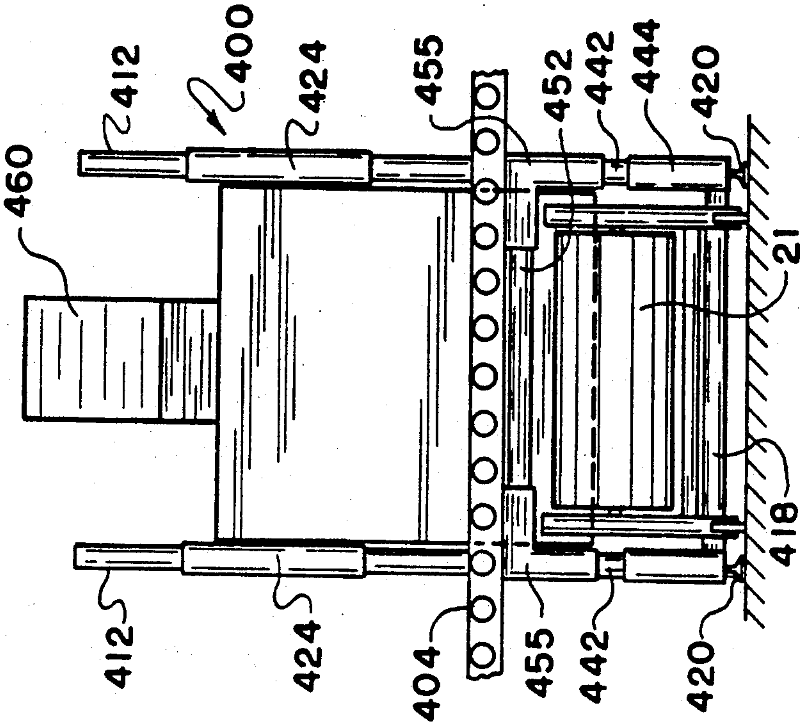
FIG. 16 is a front view of the packaging system shown in FIG. 15.
Figure 15:
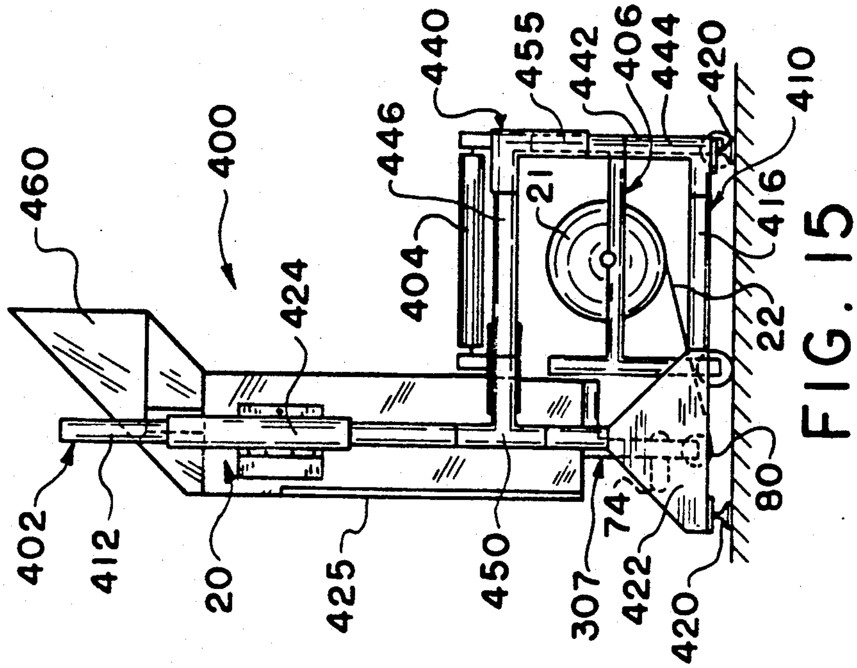
FIG. 15 is a side view of another packaging system according to the present invention employing one cushioning dunnage machine positioned in a vertical manner.

Another packaging system 400 according to the present invention is shown in FIGS. 15 and 16, this system including only one machine 20 orientated with its downstream end positioned above its upstream end. Such an arrangement may be desirable due to height limitations in the packaging facility and/or other considerations. The packaging system 400 also includes a machine mounting stand 402 for mounting the machine 20 in this orientation, a packaging surface in the form of a single conveyor belt 404, and a stock dispenser comprising a stock supply cart 406. The stock supply cart 406 is similar to the stock supply carts 326 described above in reference to FIGS. 11 and 12 except that stock supply cart 406 has neither a deflector 390 nor a guiding rod 392. The conveyor belt 404 is likewise similar to the conveyor belts 324 of system 320 except that conveyor belt 404 is supported, at least in part, by the machine mounting stand 402.

The components are arranged so that the stock material 22 passes from the roll 21 slightly downwardly to the constant-entry bar 80 and then continues upwardly through the sheet separator 74 and the rest of the machine. The machine mounting stand 402 includes a floor support 410 and two vertical posts 412 extending therefrom. The floor support 410 is generally "U" shaped and has two side members 416 extending perpendicularly from a connecting cross bar 418. The cross bar 418 is positioned parallel to the flow direction of the conveyor belt 404, however it is offset from the conveyor belt 404 in one direction, this direction being to the left in FIG. 15. Leveling feet 420 may be provided on the two ends of each of the side members 416 for adjustment purposes. The side members 416 and the cross bar 418 together define three sides of a rectangular space under the conveyor belt 404 into which the stock supply cart 406 neatly fits.

The vertical posts 412 are secured to the side members 416 by triangular braces 422 secured to the proximal ends of the side members 416. As is best seen in FIG. 16, the mounting stand 402 does not include a top cross bar. Additionally, the space between the vertical posts 412 is occupied by the machine 20, while the area between the posts 412 and below the machine 20 is left relatively open for the stock material 22 to pass from the stock roll 21 to the stock supply assembly 50.

The machine 20 is again selectively slidably mounted on the vertical posts 412 by sliders 424 which may be identical to the sliders 360 used in the packaging system 320. However in the packaging system 400, the sliders 424 are attached to the transverse sides 314 of the machine cover 310. With this attachment arrangement, it may be desirable to permanently and securely attach the transverse sides 314 of the cover 310 to the frame 36 of the machine while making the longitudinal side 312 of the cover 310 selectively removable as by hinge 425.

The machine 20 is mounted to the sliders 424 by the same mounting components shown in FIGS. 13 and 14 and employed in the packaging system 320. However, instead of having a machine 20 mounted on each side angle bracket 365 of the slider 360 as above, the left-hand side angle bracket 365 would be secured to the swivel plate 370 by fasteners 37 extending through the second central set of openings 373. The right-hand side angle bracket 365 would be secured to the swivel plate 370 and the stop plate 375 by the spring plunger 379. The spring plunger 379 would pass though the larger central hole 374 in the wall 367 of the right-hand bracket 365 and through one of the openings 378 in the circular array.

The machine mounting stand 402 further includes a conveyor support 440 on which the conveyor belt 404 is at least partially supported. The conveyor support 440 includes two vertical bars 442 attached to the distal ends of the side members 416 by L-braces 444; two horizontal bars 446 connected to an intermediate portion of the vertical posts 412 by T-braces 450; and a third horizontal bar 452 connected to the first and second horizontal bars 446 by the T-braces 455. The conveyor belt 404 rests on the horizonal bars 446 and 452 and is thereby positioned beneath the pad chute 460. Cut sections 32 will be dropped from the pad chute 460 into shipping cases (not shown) traveling on the conveyor belt 404.

Figure 17:
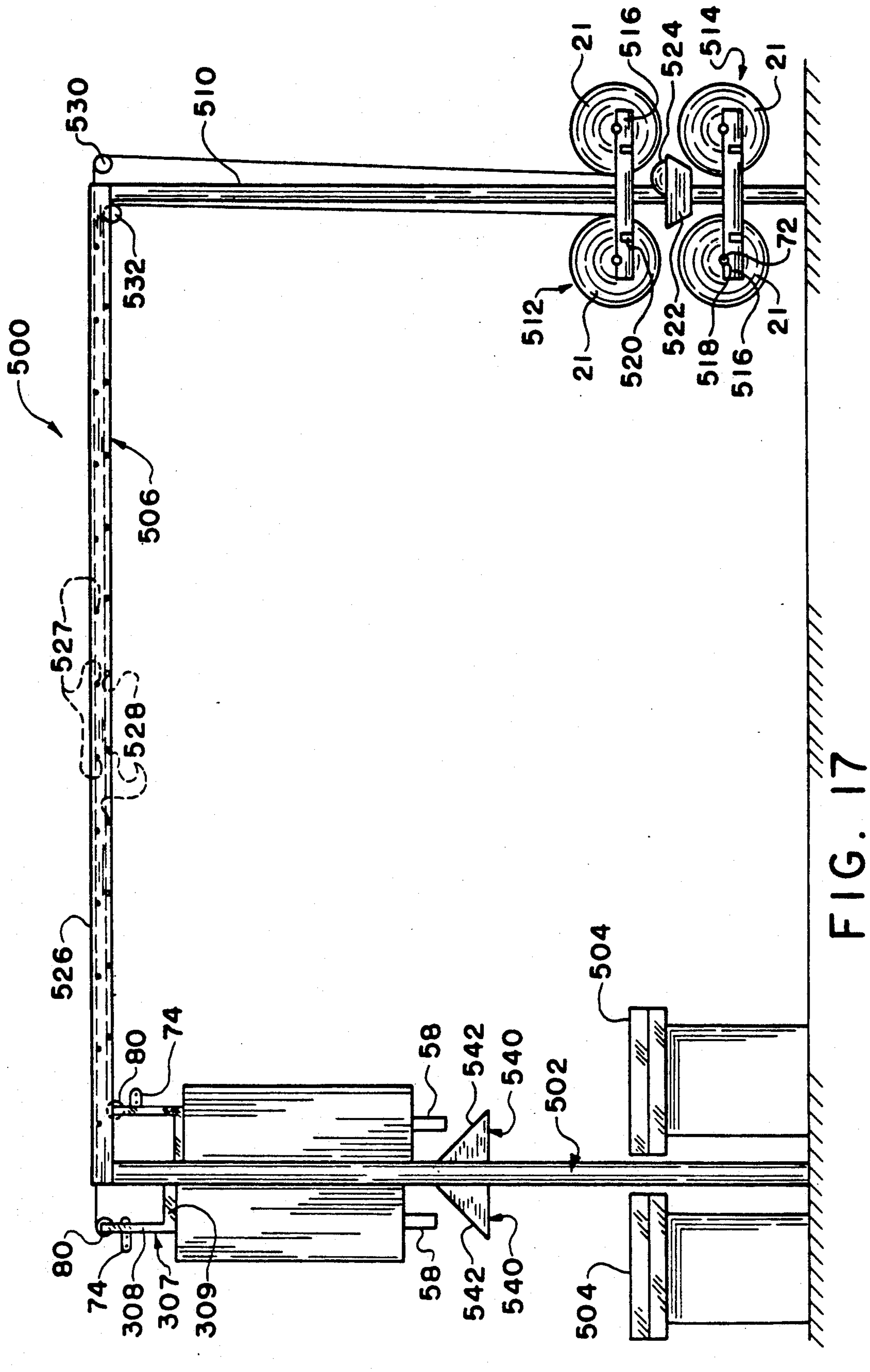
FIG. 17 is a side view of yet another packaging system to the present invention, this system employing two cushioning dunnage machines positioned in a vertical manner and a remote stock roll supply assembly.

Turning now to FIG. 17, yet another packaging system 500 according to the present invention is shown, this system employing two machines 20. The machines 20 are again positioned in a vertical manner and in this system the upstream or "feed" end of the machines are located above their downstream or "discharge" ends. Several differences between the packaging system 500 and systems 320 and 400 may be initially noted. First, in the packaging system 500 the two machines 20 are fixedly, rather than slidably, mounted to a machine mounting stand 502. This stand 502 may simply be a single vertical wall with one of the machines 20 mounted on each side. Additionally, instead of conveyor belts, the system 500 has nonmoving packing stations or tables 504. Further, the system 500 does not have stock supply carts but instead includes a permanent nonmovable stock supply structure 506.

The stock supply structure 506 includes two parallel vertical beams 510 of about the same height as the mounting stand 502 and positioned remote therefrom. An upper stock dispenser 512 and a lower stock dispenser 514 are secured to the lower ends of the vertical beams 510. Each dispenser holds two rolls 21 of stock material 22 and the positioning of the dispensers 512 and 514 at this location permits safe and convenient reloading of the stock material 22 at floor level. In the illustrated embodiment, the machines 20 are loaded with stock material 22 from the stock rolls 21 held in the upper stock dispenser 512. However, stock material 22 from the stock rolls 21 held in the lower stock dispenser 514 could be just as easily loaded into the machine 20 if necessary or desired.

The dispensers 512 and 514 are essentially identical and each is comprised of two side members 516, one side member being perpendicularly secured to each of the vertical beams 510. The distal end of each of the side members 516 includes a recess 518 for cradling the supply rod 72, whereby each dispenser holds two stock rolls 21. The dispensers further include two limit switches 520, one for each of the rolls. A tape container 522 for a roll of tape 514 may be conveniently secured between the upper dispenser 512 and the lower dispenser 514.

The stock supply structure 506 further includes two horizontal beams 526, each beam 526 connecting the top end of one of the vertical beams 510 to the top end of the machine mounting stand 502. Small upper guide rods 527 extend from one beam 526 to the other beam thereby forming an upper guide track for stock material 22 from the stock roll 21 positioned to the right in FIG. 17. Similarly, small lower guide rods 528 extend from one beam to the other beam thereby forming a lower guide track for stock material 22 from the stock roll 21 positioned to the left in FIG. 17. The lower guide rods 528 are slightly horizontally offset from the upper guide rods 527.

In operation, the stock material 22 will travel from the upper stock dispenser 512 upwardly to the corner formed by the beams 510 and 526. At this corner, the stock material must essentially make at 90° turn to continue its path to the machine 20. To encourage a smooth transition, two guide rods 530 and 532 are rotatively mounted at this corner. The upper guide rod 530 is positioned slightly outwardly from the vertical beams 510 to align the stock material from the right hand stock roll with the upper guide track. The lower guide rod 532 is positioned to align the stock material from the left hand roll with the lower guide track. In this manner, the stock material 22 smoothly passes into the guide tracks.

At the opposite end of the horizontal beams 526, the stock material must again make an essentially 90° turn to enter a machine 20. This transition is accomplished by the constant-entry bars 80 of the stock supply assemblies 50. To this end, the left hand machine 20, which receives stock material 22 from the right hand stock roll 21, is positioned so that its constant-entry bar 80 is aligned with the upper guide track. The right hand machine, which receives stock from the left hand stock roll, is mounted slightly below the left hand machine so that its constant-entry bar 80 is aligned with the lower guide track.

The stock material 22 then passes through the sheet separator 74 and so forth through the machine 20 where it is converted into cut sections 32 of a desired length. The cut sections 32 then exit the machine through the post-cutting constraining assembly 58 and drop downwardly. Deflectors 540 may be strategically mounted on the machine mounting stand 502 to urge the cut sections 32 towards the proper part of the mounting stand 502. The deflectors 540 are shaped generally like a prism having an outwardly sloping wall 542, the slope and the length of the wall 542 being determinative of where the cut sections 32 will drop on the packing stations 504.

One may appreciate that packaging systems according to the present invention may be incorporated into and/or initiated at a multitude of packaging sites. Additionally, these and other packaging systems employing one or more cushioning dunnage conversion machines 20 may be appropriately modified to suit many applications. This wide range of compatibility makes biodegradable, recyclable and renewable paper protective packaging material a very attractive alterative to plastic bubble wrap and/or plastic foam peanuts. Thus industries may now more easily make the environmentally responsible choice of paper rather than plastic protective packaging material.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

Having thus described the preferred embodiments, the invention is now claimed to be:

1. A cushioning dunnage conversion machine for converting sheet-like stock material, such as paper in multi-ply form, into cut sections of relatively low density pad-like cushioning dunnage product, said machine comprising:

a frame including a frame base plate having an upstream end and a downstream end, a first upstream frame end plate extending generally perpendicularly from said upstream end of said frame base plate and a second downstream frame end plate extending in substantially the same direction as said first frame end plate from said downstream end of said frame base plate;

a forming assembly, mounted on said base frame plate intermediate said upstream end and said downstream end, which causes inward rolling of the lateral edges of such sheet-like material into a generally spiral-like form whereby a continuous unconnected strip having two lateral pillow-like portions separated by as thin central band is formed;

a stock supply assembly, located upstream of said forming assembly and mounted on said first frame end plate, which supplies such stock material to said forming assembly;

a pulling/connecting assembly, located downstream of said forming assembly and mounted on an upstream side of said second frame end plate, which pulls such stock material from said stock supply assembly and through said forming assembly to form such continuous unconnected strip and which connects such continuous unconnected strip along such central band whereby a coined strip of pad-like cushioning dunnage product is formed;

a cutting assembly, mounted on an opposite downstream side of said second frame end plate and thereby being located downstream of said pulling/connecting assembly, which cuts such coined strip into cut sections of a desired length.

2. A conversion machine as set forth in claim 1 wherein said frame end plates are approximately 34 inches wide and approximately 12 inches tall.

3. A conversion machine as set forth in claim 1 wherein an outer side of said frame base plate forms a smooth uninterrupted surface.

4. A conversion machine as set forth in claim 1 further comprising a first motor for powering said pulling/connecting assembly and a second motor for powering said cutting assembly and wherein both of said motors are mounted on said base plate at substantially the same level as said forming assembly.

5. A conversion machine as set forth in claim 1 wherein said second downstream end plate is aluminum.

6. A conversion machine as set forth in claim 1 wherein said cutting assembly includes a stationary blade and a sliding blade which coact in a guillotine fashion to cut such coined strip into such cut sections.

7. A cushioning conversion machine for converting sheet-like stock material, such as paper in multi-ply form, into cut sections of relatively low density pad-like cushioning dunnage product, said machine comprising:

a frame including a frame base plate having an upstream end and a downstream end, a first upstream frame end plate extending generally perpendicularly from said upstream end of said frame base plate and a second downstream frame end plate extending in substantially the same direction as said first frame end plate from said downstream end of said frame base plate;

a forming assembly, mounted on said base frame plate intermediate said upstream end and said downstream end, which causes inward rolling of the lateral edges of such sheet-like material into a generally spiral-like form whereby a continuous unconnected strip having two lateral pillow-like portions separated by a thin central band is formed;

a stock supply assembly, located upstream of said forming assembly and mounted on said first frame end plate, which supplies such stock material to said forming assembly;

a pulling/connecting assembly, located downstream of said forming assembly and mounted on an upstream side of said second frame end plate, which pulls such stock material from said stock supply assembly and through said forming assembly to form such continuous unconnected strip and which connects such continuous unconnected strip along such central band whereby a coined strip of pad-like cushioning dunnage product is formed; and a cutting assembly, mounted on an opposite downstream side of said second frame end plate and thereby being located downstream of said pulling-/connecting assembly, which cuts such coined strip into cut sections of a desired length;

said cutting assembly including a stationary blade and a sliding blade which coact in a guillotine fashion to cut such coined strip into such cut sections;

said second downstream frame end plate having an outlet opening dimensioned to allow such coined strip to pass from the upstream side of said second frame end plate to the downstream side of said second frame end plate;

said outlet opening having a proximal side, a distal side and two lateral sides;

said stationary blade being fixedly mounted on the downstream side of said second frame end plate and is aligned with said proximal side of said outlet opening;

said sliding blade being slidably mounted on the downstream side of said second downstream end plate within cutter guide bars; and said cutter guide bars being positioned beyond and parallel to said lateral sides of said outlet opening and also extending beyond said distal side and said proximal side of said outlet opening whereby said sliding blade may travel from an open position completely clearing said blade outlet opening to a closed position beyond said stationary blade.

8. A conversion machine as set forth in claim 7 further comprising:

a motor, mounted on said frame base plate at substantially the same level as said forming assembly, for powering said cutting assembly; and a clutch assembly, mounted on said second downstream frame end plate, for serving as an interface between said motor and said cutting assembly.

9. A conversion machine as set forth in claim 8 wherein said cutting assembly further includes:

a cutter linkage connected to said sliding blade;

a drive linkage pivotally connected to said cutter linkage;

a motion disk having a tangential portion connected to said drive linkage; and a shaft connected to said motion disk and connected to said clutch assembly.

10. A conversion machine as set forth in claim 9 wherein said sliding blade is offset a slight distance from said stationary blade and said cutting assembly further includes a manual adjustment device for manually adjusting said slight distance.

11. A conversion machine as set forth in claim 9 wherein said sliding blade is offset a slight distance from said stationary blade and said cutting assembly further includes an automatic adjustment device for automatically adjusting said stationary blade so that it is offset a slight distance from said sliding blade.

12. A conversion machine as set forth in claim 9 further comprising a post-cutting constraining assembly, mounted on said frame downstream of said cutting assembly, for circumferentially and longitudinally constraining such cut sections.

13. A conversion machine as set forth in claim 12 wherein said forming assembly includes a converging chute having a first portion attached to said frame end plate and a second portion pivotally attached to said first portion whereby said chute may be opened for initial manual threading of the machine and closed for normal automatic operation.

14. A conversion machine as set forth in claim 13 wherein said frame is positioned in a substantially vertical manner whereby an imaginary line through said upstream end to said downstream end would be substantially vertical.

15. A conversion machine as set forth in claim 14 wherein said stock supply assembly includes:

two laterally spaced U-brackets each having a first leg and a second leg extending perpendicularly from a flat connecting wall;

wherein each of said connecting walls is suitably secured to the downstream side of said first frame end plate such that said first legs are generally aligned with said frame base plate;

wherein said first legs each have open slots in their distal ends to cradle a supply rod adapted to extend through the hollow core of a stock roll;

wherein said second legs extend from an intermediate portion of said first frame end plate;

wherein said second legs cooperate to mount a sheet separator for separating the plies of stock material prior to passing to said forming assembly; and wherein said second legs also cooperate to mount a constant-entry bar for providing a nonvarying point of entry into said separator and said forming assembly.

16. A conversion machine as set forth in claim 15, wherein said forming assembly includes a rod-like shaping member, a converging chute, a transverse guide structure and a guide tray; and wherein:

said rod-like shaping member is supported by a vertical strap attached to the distal ends of said first and second frame end plates;

said guide tray is directly mounted on said frame base plate;

said guide tray is trapezoidal in shape having a broad upstream side positioned downstream of at least a portion of said shaping member and a parallel narrow downstream side positioned adjacent said outlet opening in said second frame end plate;

said guide tray includes a rectangular slot near said downstream side to accommodate said pulling/connecting assembly;

said guide tray is positioned so as to form an outwardly sloped surface from said frame base plate to said converging chute to said pulling/connecting assembly whereby said guide tray longitudinally guides such stock material into said converging chute and such continuous unconnected strip to said pulling/connecting assembly;

said converging chute is mounted on said guide tray upstream of at least a portion of said shaping member; and said transverse guide structure includes spaced rotatable rollers positioned along the lateral sides of the entrance mouth of said converging chute.

17. A conversion machine as set forth in claim 16 further comprising a motor to power said pulling/connecting assembly and wherein:

said motor is mounted on said frame base plate;

said pulling/connecting assembly includes a drive gear and an idler gear positioned to receive such unconnected continuous strip therebetween whereby such central band will be grabbed by the teeth of said gears and pulled downstream and the gear teeth will also compress such central band to form such coined strip;

said drive gear is positioned on the side of said guide tray adjacent said frame base plate and projects through said rectangular slot in said guide tray;

said drive gear is fixedly mounted to a shaft which is driven by said motor and which is rotatively mounted to the upstream side of said second frame end plate;

said idler guide is positioned on the opposite side of said guide tray than said drive gear; and said idler gear is rotatively mounted to a shaft which is mounted to the upstream side of said second frame end plate.

18. A cushioning dunnage conversion machine for converting sheet-like stock material, such as paper in multi-ply form, into cut sections of relatively low density pad-like cushioning dunnage product, said machine comprising:

a frame having a downstream end and an upstream end;

a forming assembly, mounted on said frame intermediate said upstream end and said downstream end, which causes inward rolling of the lateral edges of such sheet-like material in a generally spiral-like form whereby a continuous unconnected strip having two lateral pillow-like portion separated by a central band is formed;

a stock supply assembly, mounted on said frame upstream of said forming assembly, which supplies such stock material to said forming assembly;

a pulling/connecting assembly, mounted on said frame downstream of said forming assembly, which pulls such stock material rom said stock supply assembly through said forming assembly and for connecting such continuous unconnected strip along such central band whereby a coined strip of pad-like cushioning dunnage product is formed;

a cutting assembly, mounted on said frame downstream of said pulling/connecting assembly, which cuts such coined strip into cut sections of a desired length; and a post-cutting constraining assembly, mounted on said frame downstream of said cutting assembly, which circumferentially constrains such cut sections.

19. A cushioning conversion machine for converting sheet-like stock material, such as paper in multi-ply form, into cut sections of relatively low density pad-like cushioning dunnage product, said machine comprising:

a frame having a downstream end and an upstream end;

a forming assembly, mounted on said frame intermediate said upstream end and said downstream end, which causes inward rolling of the lateral edges of such sheet-like material in a generally spiral-like form whereby a continuous unconnected strip having two lateral pillow-like portions separated by a central band is formed;

a stock supply assembly, mounted on said frame upstream of said forming assembly, which supplies such stock material to said forming assembly;

a pulling/connecting assembly, mounted on said frame downstream of said forming assembly, which pulls such stock material from said stock supply assembly through said forming assembly and which connects such continuous unconnected strip along such central band whereby a coined strip of pad-like cushioning dunnage product is formed;

a cutting assembly, mounted on said frame downstream of said pulling/connecting assembly, which cuts such coined strip into cut sections of a desired length; and a post-cutting constraining assembly, mounted on said frame downstream of said cutting assembly, which circumferentially constrains such cut sections;

wherein said post-cutting constraining assembly is funnel-shape and includes an upstream converging portion which tapers into a downstream rectangular tunnel portion.

20. A conversion machine as set forth in claim 19 wherein said frame includes a rectangular box extension attached to said downstream end and said post-cutting constraining assembly is mounted on said extension.

21. A conversion machine as set forth in claim 20 wherein said converging portion is positioned between said downstream end of said frame and said extension and said tunnel portion extends through and beyond said extension.

22. A conversion machine as set forth in claim 21 wherein said frame includes an outlet opening and wherein said post-cutting constraining assembly has an inlet and an outlet aligned with said outlet opening in said downstream frame end plate.

23. A method of producing cut sections of relatively low density pad-like cushioning dunnage product, comprising the steps of:

supplying a sheet-like multi-ply stock material;

causing inward rolling of the latcral edges of the sheet-like stock material in a generally spiral-like form whereby a continuous unconnected strip having two lateral pillow-like portions separated by a central band is formed;

connecting such unconnected strips along such central band whereby a coined strip of pad-like dunnage product is formed;

cutting such coined strip into cut sections of a desired length; and circumferentially constraining such cut sections.

24. A method of producing a relatively low density pad-like cushioning product, comprising the steps of:

supplying a sheet-like material;

pulling such sheet-like material in a generally vertical direction;

causing inward rolling of the lateral edges of the sheet-like stock material in a generally spiral-like form whereby a continuous unconnected strip having two lateral pillow-like portions separated by a central band is formed;

pulling such continuous unconnected strip in a vertical direction;

connecting such unconnected strip along such central band whereby a coined strip of pad-like cushion dunnage product is formed;

cutting such coined strip into cut sections of a desired length; and circumferentially constraining such cut sections.

25. A conversion machine as set forth in claim 1 wherein said cutting assembly includes:

a first blade; and a second blade positioned to coact with said first blade to cut such coined strip into such cut sections.

26. A conversion machine as set forth in claim 25 further comprising:

a motor mounted on said frame base plate at substantially the same level as said forming assembly, for powering said cutting assembly; and a clutch assembly, mounted on said second downstream frame end plate, for serving as an interface between said motor and said cutting assembly.

27. A cushioning dunnage conversion machine for converting sheet-like stock material, such as paper in multi-ply form, into cut sections of relatively low density pad-like cushioning dunnage product, said machine comprising:

a frame including a frame base plate having an upstream end and a downstream end, a first upstream frame end plate extending generally perpendicular from said upstream end of said frame base plate and a second downstream frame end plate extending in substantially the same direction as said first frame end plate from said downstream end of said frame base plate;

a forming assembly, mounted on said base frame plate intermediate said upstream end and said downstream end, which causes inward rolling of the lateral edges of such sheet-like material into a generally spiral-like form whereby a continuous unconnected strip having two lateral pillow-like portions separated by a thin central band is formed;

a stock supply assembly, located upstream of said forming assembly and mounted on said first frame end plate, which supplies such stock material to said forming assembly;

a pulling/connecting assembly, located downstream of said forming assembly and mounted on an upstream side of said second frame end plate, which pulls such stock material from said stock supply assembly and through said forming assembly to form such continuous unconnected strip and which connects such continuous unconnected strip along such central band whereby a coined strip of pad-like cushioning dunnage product is formed;

a cutting assembly, mounted on an opposite downstream side of said second frame end plate and thereby being located downstream of said pulling/connecting assembly, which cuts such coined strip into cut sections of a desired length; said cutting assembly including a first blade and a second blade positioned to coact with said first blade to cut such coined strip into such cut sections;

a motor, mounted on said frame base plate at substantially the same level as said forming assembly, for powering said cutting assembly; and a clutch assembly, mounted on said second downstream frame end plate, for serving as an interface between said motor and said cutting assembly;

wherein said cutting assembly further includes:

a cutter linkage connected to at least one of said blades;

a drive linkage pivotally connected to said cutter linkage;

a motion disk having a tangential portion connected to said drive linkage; and a shaft connected to said motion disk and connected to said clutch assembly.

28. A conversion machine as set forth in claim 27, wherein said second downstream end plate includes an offset open slot on one side and wherein said shaft is positioned within said slot.

29. A cushioning dunnage conversion machine for converting sheet-like stock material, such as paper in multi-ply form, into a coined strip of relative low density pad-like cushioning dunnage product, said machine comprising:

a frame having an upstream end and a downstream end;

forming assembly, mounted on said frame intermediate said upstream end and said downstream end, which causes inward rolling of the lateral edges of such sheet-like material into a generally spiral-like form whereby a continuous unconnected strip having two lateral pillow-like portions separated by a thin central band is formed; said forming including a converging chute having a first portion and a second portion pivotally attached to said first portion whereby said chute may be opened for initial manual threading of the machine and closed for normal automatic operation;

a stock supply assembly, mounted on said frame upstream of said forming assembly, which supplies such stock material to said forming assembly; and a pulling/connecting assembly, mounted on said frame downstream of said forming assembly, which pulls such stock material from said stock supply assembly and through said forming assembly and which connects such continuous unconnected strip along such central band whereby a coined strip of pad-like cushioning dunnage product is formed; and a cutting assembly which cuts such coined strip into cut sections of a desired length

30. A conversion machine as set forth in claim 9 wherein said sliding blade is offset a slight distance from said stationary blade and said cutting assembly further includes an adjustment device for adjusting said stationary blade so that it is offset a slight distance from said sliding blade.

* * * * *